US012637064B2

(12) United States Patent　　　(10) Patent No.: US 12,637,064 B2
Ogawa et al.　　　　　　　　　　(45) Date of Patent: May 26, 2026

(54) DRIVING ASSISTANCE DEVICE AND COMPUTER PROGRAM

(71) Applicant: AISIN CORPORATION, Kariya (JP)

(72) Inventors: Keita Ogawa, Kariya (JP); Mitsuhiro Nimura, Kariya (JP); Hidenori Nagasaka, Kariya (JP)

(73) Assignee: AISIN CORPORATION, Kariya (JP)

( * ) Notice: Subject to any disclaimer, the term of this patent is extended or adjusted under 35 U.S.C. 154(b) by 22 days.

(21) Appl. No.: 18/709,143

(22) PCT Filed: Dec. 22, 2022

(86) PCT No.: PCT/JP2022/047398

§ 371 (c)(1),
(2) Date: May 10, 2024

(87) PCT Pub. No.: WO2023/140041

PCT Pub. Date: Jul. 27, 2023

(65) Prior Publication Data

US 2025/0002006 A1　　Jan. 2, 2025

(30) Foreign Application Priority Data

Jan. 24, 2022　(JP) ................................ 2022-008427
Sep. 15, 2022　(JP) ................................ 2022-146915

(51) Int. Cl.
　　*B60W 30/06*　　　(2006.01)
　　*B60W 60/00*　　　(2020.01)
(52) U.S. Cl.
　　CPC ........ *B60W 30/06* (2013.01); *B60W 60/0011* (2020.02)

(58) Field of Classification Search
None
See application file for complete search history.

(56) References Cited

U.S. PATENT DOCUMENTS

2021/0217310 A1 * 7/2021 Ikoma ................... G08G 1/146
2021/0300337 A1 * 9/2021 Fujitani ................. G08G 1/143

FOREIGN PATENT DOCUMENTS

JP　　 2018-039294 A　　 3/2018
WO　　2019/225270 A1　　11/2019

OTHER PUBLICATIONS

International Search Report for PCT/JP2022/047398 dated Mar. 14, 2023.

* cited by examiner

*Primary Examiner* — Steven Lim

(74) *Attorney, Agent, or Firm* — Sughrue Mion, PLLC

(57) ABSTRACT

Provided is a driving assistance device allowing, when a vehicle is parked in a parking lot, provision of driving assistance based on an appropriate travel path. The device is configured such that when a vehicle is parked in a parking lot, an intra-parking-lot network representing a route that can be selected by the vehicle in the parking lot is obtained. Using this network, a candidate entry path for a vehicle's travel path from an entrance to the parking lot to a parking location is generated and obtained using the intra-parking-lot network based on a first condition. If determined that the condition for suitability is not satisfied, the candidate entry path determined not to satisfy the condition for suitability is modified based on a second condition different from the first condition and driving assistance is provided based on the modified candidate entry path.

6 Claims, 20 Drawing Sheets

DRIVING ASSISTANCE DEVICE AND COMPUTER PROGRAM

CROSS REFERENCE TO RELATED APPLICATIONS

This application is a National Stage of International Application No. PCT/JP2022/047398 filed Dec. 22, 2022, claiming priority based on Japanese Patent Application No. 2022-146915 filed Sep. 15, 2022 and Japanese Patent Application No. 2022-008427 filed Jan. 24, 2022, the entire contents of which are incorporated in their entirety.

TECHNICAL FIELD

The present disclosure relates to a driving assistance device and a computer program that assist in vehicle's driving in a parking lot.

BACKGROUND ART

When a vehicle moves to a destination, generally, the vehicle moves to a parking lot belonging to the destination or a parking lot around the destination and is parked, and a user moves on foot, etc., to a point that is the destination from a parking space where the vehicle is parked in the parking lot, by which the movement is completed. In this case, when such movement to the destination is assisted, particularly, vehicle's travel in the parking lot is short in distance traveled, compared to travel on roads, but has many candidates for a travel path that can be taken by the vehicle, and thus, it has been difficult to select an optimal travel path from among the candidates.

Particularly, when a passage in the parking lot is wide, a travel path greatly varies depending also on which location on the passage the vehicle travels through. For example, JP 2018-39294 A discloses that in a case of generating a travel path of a vehicle traveling in a parking lot, for a travel path in which the vehicle travels on a narrow-width passage, a travel path in which the vehicle travels near the center of the narrow-width passage is generated, whereas for a travel path in which the vehicle travels on a wide-width passage, a travel path in which the vehicle travels through a location that is more on the left or right side of the wide-width passage is generated.

CITATIONS LIST

Patent Literature

Patent Literature 1: JP 2018-39294 A (paragraphs 0037-0042)

SUMMARY OF THE DISCLOSURE

Technical Problems

Here, in the above-described Patent Literature 1, for a travel path in which the vehicle travels on a wide-width passage, a travel path in which the vehicle travels through a location that is more on the left or right side of the wide-width passage is generated, but traveling through a location that is more on the left or right side of the passage is not always a suitable travel path compared to a case of traveling near the center of the passage. By traveling through a location that is more on the left or right side of the passage, a travel path taken thereafter may have a factor that is to be avoided as a travel path, such as a plurality of back-and-forth movements. However, in the above-described Patent Literature 1, even when a travel path that causes such a factor is generated, means for appropriately evaluating and modifying the temporarily generated travel path has not been available.

Aspects of the present disclosure are made to solve the above-described conventional problem and provides a driving assistance device and a computer program that enable, when a vehicle travels in a parking lot, provision of driving assistance based on a more appropriate travel path compared to conventional cases, by evaluating suitability as a travel path for a temporarily generated candidate for a travel path and modifying the temporarily generated candidate for a travel path based on a result of the evaluation and by changing a generation condition.

Solutions to Problems

To provide the above-described driving assistance device, a first driving assistance device according to the present disclosure includes: intra-parking-lot network obtaining means for obtaining an intra-parking-lot network when a vehicle is parked in a parking lot, the intra-parking-lot network being a network representing a route that can be selected by a vehicle in the parking lot; candidate entry path obtaining means for generating and obtaining a candidate entry path, using the intra-parking-lot network and based on a first condition, the candidate entry path being a candidate for a vehicle's travel path from an entrance to a parking lot to a parking location where a vehicle is parked; condition determining means for determining whether or not the candidate entry path satisfies a condition for suitability indicating suitability as a vehicle's travel path; travel path modifying means for modifying, when the condition determining means has determined that the condition for suitability is not satisfied, the candidate entry path determined not to satisfy the condition for suitability, based on a second condition different from the first condition; and driving assistance means for providing driving assistance based on the modified candidate entry path.

In addition, a second driving assistance device according to the present disclosure includes: intra-parking-lot network obtaining means for obtaining an intra-parking-lot network when a vehicle exits a parking lot where the vehicle is parked, the intra-parking-lot network being a network representing a route that can be selected by a vehicle in the parking lot; candidate exit path obtaining means for generating and obtaining a candidate exit path, using the intra-parking-lot network and based on a first condition, the candidate exit path being a candidate for a vehicle's travel path from a parking location where a vehicle is parked to an exit of a parking lot; condition determining means for determining whether or not the candidate exit path satisfies a condition for suitability indicating suitability as a vehicle's travel path; travel path modifying means for modifying, when the condition determining means has determined that the condition for suitability is not satisfied, the candidate exit path determined not to satisfy the condition for suitability, based on a second condition different from the first condition; and driving assistance means for providing driving assistance based on the modified candidate exit path.

In addition, a computer program according to the present disclosure is a program that generates assistance information used for driving assistance provided in a vehicle. Specifically, the computer program causes a computer to function as: intra-parking-lot network obtaining means for obtaining an intra-parking-lot network when a vehicle is parked in a parking lot, the intra-parking-lot network being a network representing a route that can be selected by a vehicle in the parking lot; candidate entry path obtaining means for generating and obtaining a candidate entry path, using the intra-parking-lot network and based on a first condition, the candidate entry path being a candidate for a vehicle's travel path from an entrance to a parking lot to a parking location where a vehicle is parked; condition determining means for determining whether or not the candidate entry path satisfies a condition for suitability indicating suitability as a vehicle's travel path; travel path modifying means for modifying, when the condition determining means has determined that the condition for suitability is not satisfied, the candidate entry path determined not to satisfy the condition for suitability, based on a second condition different from the first condition; and driving assistance means for providing driving assistance based on the modified candidate entry path.

Advantageous Effects of Various Aspects of the Disclosure

According to the first driving assistance device and the computer program according to the present disclosure that have the above-described configurations, a candidate for a vehicle's travel path from an entrance to a parking lot to a parking location where a vehicle is parked is temporarily generated using an intra-parking-lot network, suitability as a travel path is evaluated for the generated candidate for a travel path, and the temporarily generated candidate for a travel path is modified based on a result of the evaluation and by changing a generation condition, by which, particularly, unsuitable operations such as shifts from forward movement to backward movement and vice versa and back-and-forth turning of a steering wheel are reduced, enabling provision of driving assistance based on a more appropriate travel path compared to conventional cases. In addition, according to the second driving assistance device, a candidate for a vehicle's travel path from a vehicle's parking location to an exit of a parking lot is temporarily generated using an intra-parking-lot network, suitability as a travel path is evaluated for the generated candidate for a travel path, and the temporarily generated candidate for a travel path is modified based on a result of the evaluation and by changing a generation condition, by which, particularly, unsuitable operations such as shifts from forward movement to backward movement and vice versa and back-and-forth turning of a steering wheel are reduced, enabling provision of driving assistance based on a more appropriate travel path compared to conventional cases.

DESCRIPTION OF EMBODIMENTS

Figure 1:
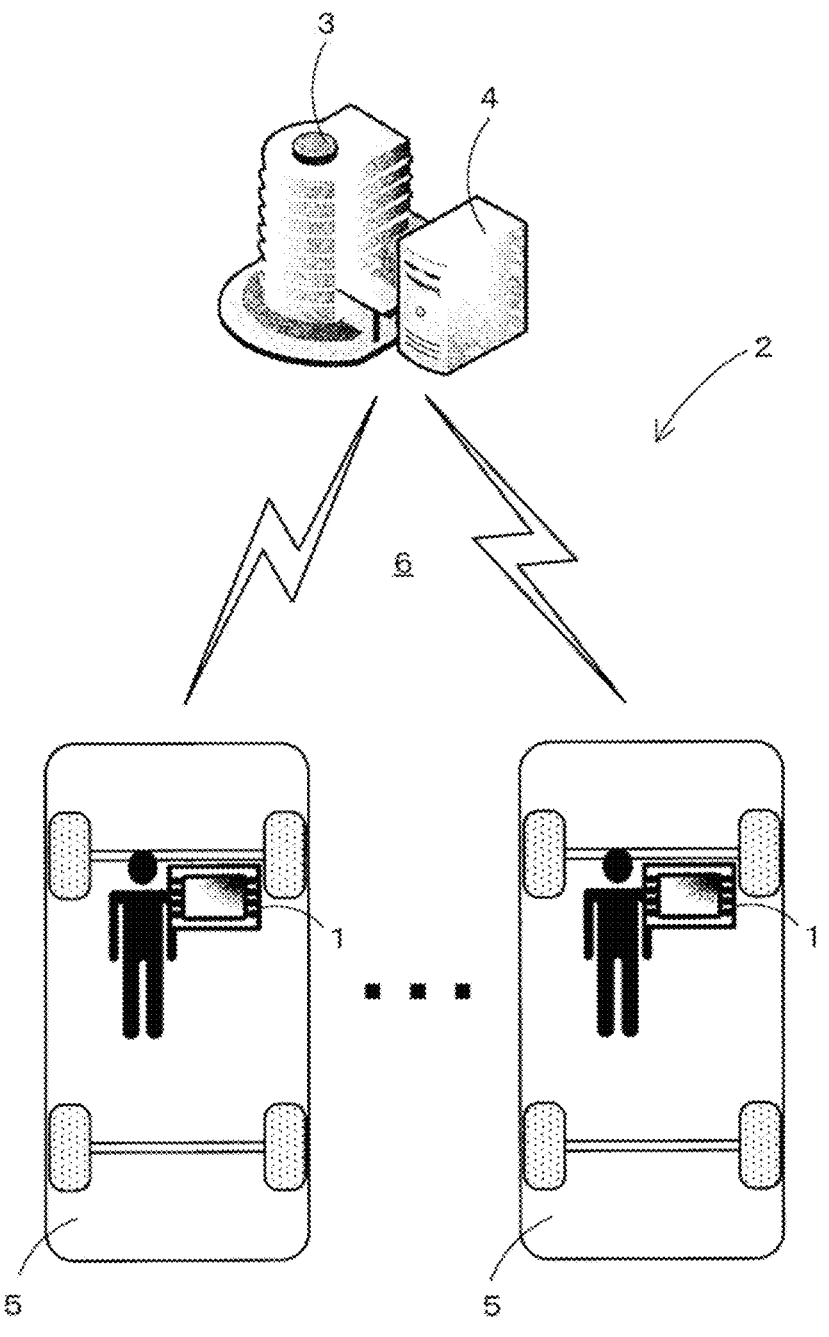
FIG. 1 is a schematic configuration diagram showing a driving assistance system according to the present embodiment.
Figure 2:
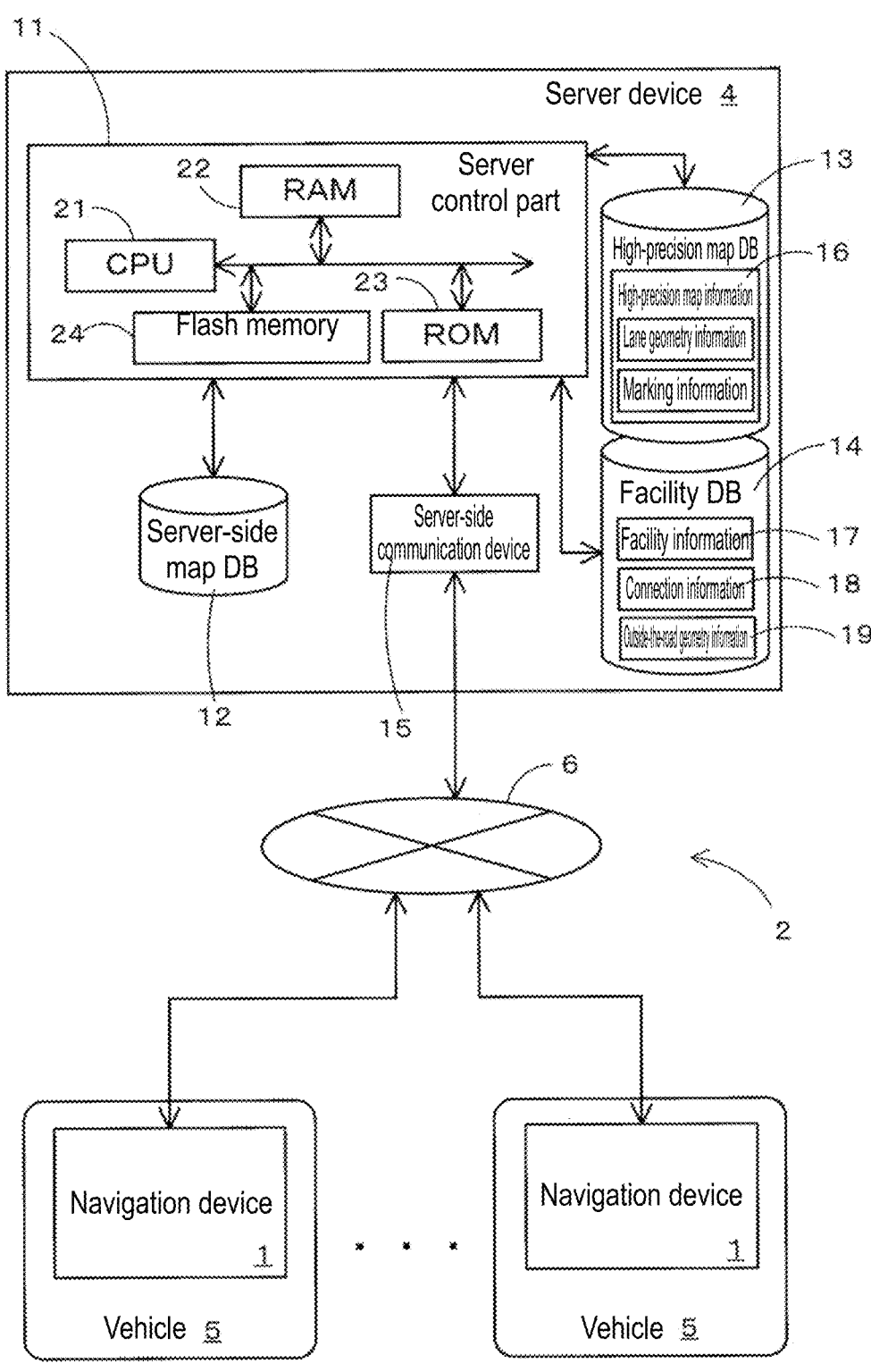
FIG. 2 is a block diagram showing a configuration of the driving assistance system according to the present embodiment.

One embodiment in which a driving assistance device according to the present disclosure is embodied into a navigation device 1 will be described in detail below with reference to the drawings. First, a schematic configuration of a driving assistance system 2 including navigation devices 1 according to the present embodiment will be described using FIGS. 1 and 2. FIG. 1 is a schematic configuration diagram showing the driving assistance system 2 according to the present embodiment. FIG. 2 is a block diagram showing a configuration of the driving assistance system 2 according to the present embodiment.

As shown in FIG. 1, the driving assistance system 2 according to the present embodiment basically includes a server device 4 provided in an information delivery center 3; and navigation devices 1 each mounted on a vehicle 5 to provide various types of assistance on autonomous driving of the vehicle 5. In addition, the server device 4 and the navigation devices 1 are configured to be able to perform transmission and reception of electronic data with each other through a communication network 6. Note that instead of the navigation device 1, other in-vehicle devices mounted on the vehicle 5 or a vehicle control device that performs control for the vehicle 5 may be used.

Here, the vehicle 5 is a vehicle that can perform assistance travel by autonomous driving assistance in which the vehicle autonomously travels on a preset route or along a road independently of user's driving operations, in addition to manual driving travel in which the vehicle travels based on user's driving operations.

In addition, a configuration may be adopted in which autonomous driving assistance is provided for all road sections or is provided only while the vehicle travels on a specific road section (e.g., an expressway having a gate at a boundary (it does not matter whether or not there is a person or whether or not a toll is collected)). The following description is made assuming that autonomous driving sections in which autonomous driving assistance for the vehicle is provided also include parking lots in addition to all road sections including general roads and expressways, and autonomous driving assistance is basically provided during a period from when the vehicle starts traveling until the vehicle finishes traveling (until the vehicle is parked). Note, however, that it is desirable that instead of always providing autonomous driving assistance when the vehicle travels on an autonomous driving section, autonomous driving assistance be provided only in a situation in which a user selects provision of autonomous driving assistance (e.g., an autonomous driving start button is turned on) and it is determined that travel by autonomous driving assistance can be performed. On the other hand, the vehicle 5 may be a vehicle that can only perform assistance travel by autonomous driving assistance.

In vehicle control performed by autonomous driving assistance, for example, a current vehicle location, a lane in which the vehicle travels, and the location of an obstacle around the vehicle are detected whenever necessary, and vehicle control of steering, a drive source, a brake, etc., is autonomously performed so that the vehicle travels along a travel path generated by the navigation device 1 and at speeds in accordance with a speed plan created by the navigation device 1 as will be described later. Note that in assistance travel by autonomous driving assistance of the present embodiment, for a lane change, a left or right turn, and a parking operation, too, travel is performed by performing the above-described vehicle control by autonomous driving assistance, but a configuration may be adopted in which special travel such as a lane change, a left or right turn, and a parking operation is performed by manual driving instead of performing travel by autonomous driving assistance.

Meanwhile, the navigation device 1 is an in-vehicle device mounted on the vehicle 5 to display a map of an area around the location of the vehicle 5 based on map data included in the navigation device 1 or map data obtained from an external source, or to allow the user to input a destination, or to display a current vehicle location on a map image, or to provide guidance on movement along a set guidance route. In the present embodiment, particularly, when the vehicle performs assistance travel by autonomous driving assistance, various types of assistance information about the autonomous driving assistance are generated. The assistance information includes, for example, a travel path recommended for the vehicle to travel along (including a recommended way of moving into lanes), selection of a parking location where the vehicle is parked at a destination, and a speed plan indicating vehicle speeds at which the vehicle travels. Note that details of the navigation device 1 will be described later.

In addition, the server device 4 performs a route search in response to a request from a navigation device 1. Specifically, information required for a route search such as a point of departure and a destination is transmitted together with a route search request from the navigation device 1 to the server device 4 (note, however, that in a case of re-searching, information about the destination does not necessarily need to be transmitted). Then, the server device 4 having received the route search request performs a route search using map information included in the server device 4, to identify a recommended route from the point of departure to the destination. Thereafter, the identified recommended route is transmitted to the navigation device 1 which is a source of the request. The navigation device 1 can provide a user with information about the received recommended route, or can also generate, using the recommended route, various types of assistance information about autonomous driving assistance as will be described later.

Furthermore, the server device 4 has high-precision map information which is map information with higher precision and facility information, separately from normal map information used for the above-described route search. The high-precision map information includes, for example, information about the lane geometries of roads (lane-by-lane road geometries, curvatures, lane widths, etc.) and markings (centerlines, lane lines, edge lines, guidelines, etc.) painted on the roads. In addition to the information, information about intersections, etc., are also included. On the other hand, the facility information is more detailed information about facilities that is stored separately from information about facilities included in the map information. The facility information includes, for example, information about a facility floor plan and an entrance to a parking lot, layout information of passages and parking spaces provided in the parking lot, information about makings that mark off the parking spaces, and connection information indicating a connection relationship between the entrance to the parking lot and a lane. The server device 4 delivers high-precision map information or facility information in response to a request from the navigation device 1, and the navigation device 1 generates, as will be described later, various types of assistance information about autonomous driving assistance, using the high-precision map information or facility information delivered from the server device 4. Note that the high-precision map information is basically map information targeting only a road (link) and an area around the road, but may be map information that also includes an area other than the area around the road.

Note, however, that the above-described route search process does not necessarily need to be performed by the server device 4, and if the navigation device 1 has map information, then the navigation device 1 may perform the route search process. In addition, the high-precision map information and the facility information may be included in advance in the navigation device 1, instead of being delivered from the server device 4.

In addition, the communication network 6 includes multiple base stations disposed all over the country; and telecommunications companies that manage and control their base stations, and is formed by connecting the base stations to the telecommunications companies by wire (optical fiber, ISDN, etc.) or wirelessly. Here, the base stations each include a transceiver and an antenna that perform communication with navigation devices 1. While the base station performs radio communication with a corresponding telecommunications company, the base station serves as an end of the communication network 6 and plays a role in relaying communication of navigation devices 1 present in an area (cell) where radio waves from the base station reach, to the server device 4.

Next, a configuration of the server device 4 in the driving assistance system 2 will be described in more detail using FIG. 2. The server device 4 includes, as shown in FIG. 2, a server control part 11, a server-side map DB 12 connected to the server control part 11 and serving as information recording means, a high-precision map DB 13, a facility DB 14, and a server-side communication device 15.

The server control part 11 is a control unit (an MCU, an MPU, etc.) that performs overall control of the server device 4, and includes a CPU 21 serving as a computing device and a control device; and internal storage devices such as a RAM 22 used as a working memory when the CPU 21 performs various types of arithmetic processing, a ROM 23 having recorded therein a program for control, etc., and a flash memory 24 that stores a program read from the ROM 23. Note that the server control part 11 has various types of means serving as processing algorithms with an ECU of a navigation device 1 which will be described later.

Meanwhile, the server-side map DB 12 is storage means for storing server-side map information which is the latest version of map information registered based on input data from an external source or based on input operations. Here, the server-side map information includes a road network and various types of information required for a route search, route guidance, and map display. The server-side map information includes, for example, network data including nodes and links that indicate a road network, link data about roads (links), node data about node points, intersection data about each intersection, point data about points such as facilities, map display data for displaying a map, search data for searching for a route, and retrieval data for retrieving a point.

In addition, the high-precision map DB 13 is storage means for storing high-precision map information 16 which is map information with higher precision than the above-described server-side map information. The high-precision map information 16 is, particularly, map information that stores more detailed information about roads on which vehicles are to travel. In the present embodiment, the high-precision map information 16 includes, for example, for a road, information about lane geometries (lane-by-lane road geometries, curvatures, lane widths, etc.) and markings (centerlines, lane lines, edge lines, guidelines, etc.) painted on the road. Furthermore, the high-precision map information 16 records data representing road gradients, cants, banks, merge areas, a location where the number of lanes decreases, a location where the road width becomes narrower, railroad crossings, etc., and records; for a corner, data representing the radius of curvature, an intersection, a T-junction, the entry and exit of the corner, etc.; for road attributes, data representing downhill slopes, uphill slopes, etc.; and for the types of road, data representing general roads such as national highways, prefectural highways, and narrow streets, and toll roads such as national expressways, urban expressways, automobile roads, general toll roads, and toll bridges. Particularly, in the present embodiment, the high-precision map information 16 also stores information that identifies, in addition to the number of lanes on a road, a passage segment in a traveling direction for each lane and a connection between roads for each lane (specifically, a correspondence between a lane included in a road before passing through an intersection and a lane included in a road after passing through the intersection). Furthermore, the high-precision map information 16 also stores speed limits set for roads.

Meanwhile, the facility DB 14 is storage means for storing more detailed information about facilities than information about facilities stored in the above-described server-side map information. Specifically, the facility DB 14 includes, as facility information 17, particularly, for a parking lot where a vehicle is to be parked (including both a parking lot belonging to a facility and an independent parking lot), information that identifies the location of an entrance/exit of the parking lot, information that identifies a layout of parking spaces in the parking lot, information about markings that mark off the parking spaces, information about passages through which vehicles and pedestrians can pass, and information about crosswalks in the parking lot and passage spaces provided for pedestrians. The facility DB 14 includes, for a facility other than a parking lot, information that identifies a floor plan of the facility. The floor plan includes, for example, information that identifies the locations of entrances and exits, passages, stairs, elevators, and escalators. In addition, the facility DB 14 includes, for a complex commercial facility having a plurality of tenants, information that identifies the location of each tenant that occupies the complex commercial facility. The facility information 17 may be, particularly, information generated by 3D modeling of a parking lot or a facility. Furthermore, the facility DB 14 also includes connection information 18 indicating a connection relationship between a lane included in an entry road facing an entrance to a parking lot and the entrance to the parking lot; and outside-the-road geometry information 19 that identifies a region between the entry road and the entrance to the parking lot, through which vehicles can pass. Details of each piece of information stored in the facility DB 14 will be described later.

Note that the high-precision map information 16 is basically map information targeting only a road (link) and an area around the road, but may be map information that also includes an area other than the area around the road. In addition, although in the example shown in FIG. 2, the server-side map information stored in the server-side map DB 12 and the information stored in the high-precision map DB 13 and the facility DB 14 are different pieces of map information, the information stored in the high-precision map DB 13 and the facility DB 14 may be a part of the server-side map information. In addition, the high-precision map DB 13 and the facility DB 14 may be a single database instead of being separated from each other.

Meanwhile, the server-side communication device 15 is a communication device for performing communication with a navigation device 1 of each vehicle 5 through the communication network 6. In addition, besides the navigation devices 1, it is also possible to receive traffic information including pieces of information such as traffic congestion information, regulation information, and traffic accident information that are transmitted from an Internet network, traffic information centers, e.g., a VICS (registered trademark: Vehicle Information and Communication System) center, etc.

Figure 3:
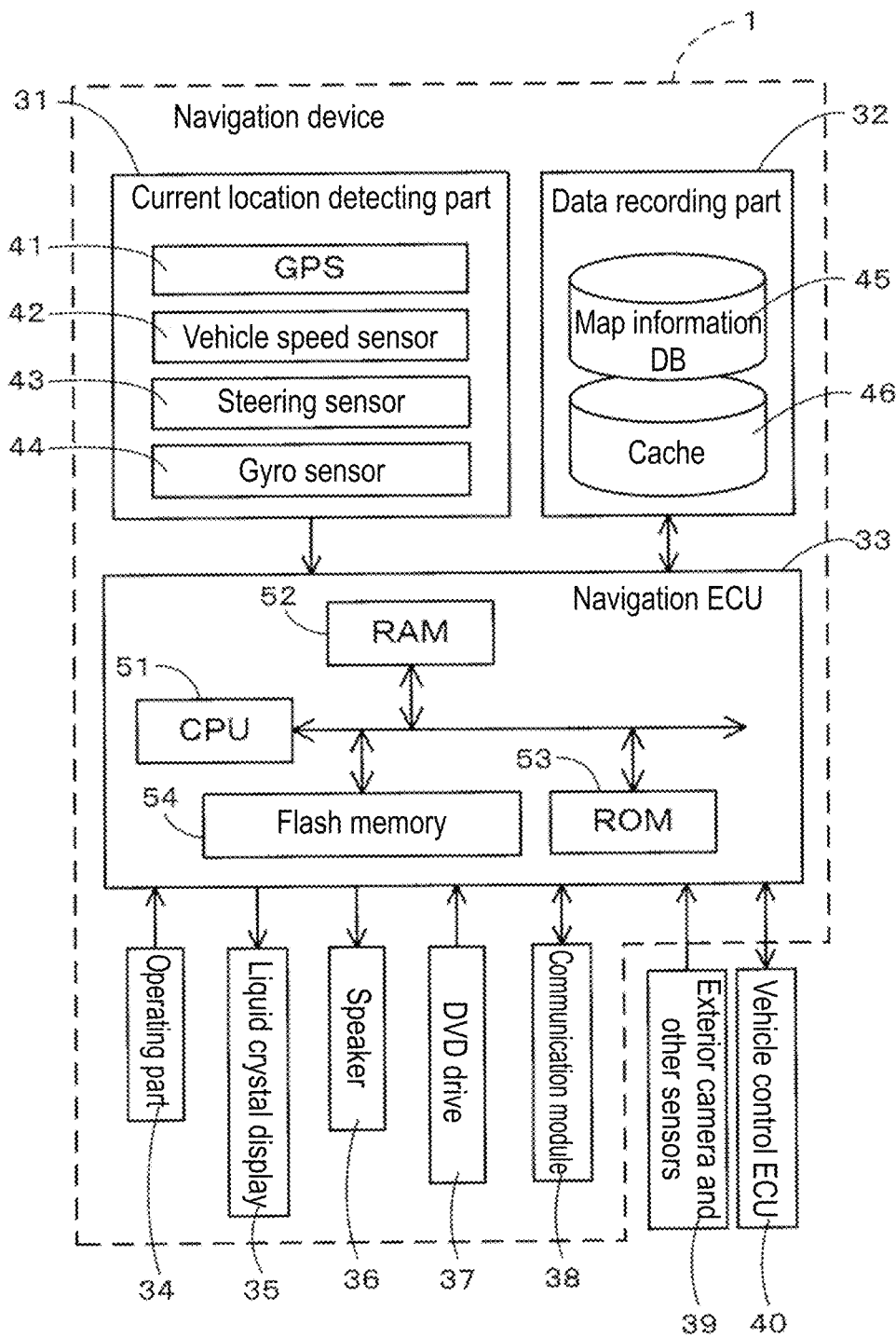
FIG. 3 is a block diagram showing a navigation device according to the present embodiment.

Next, a schematic configuration of the navigation device 1 mounted on the vehicle 5 will be described using FIG. 3. FIG. 3 is a block diagram showing the navigation device 1 according to the present embodiment.

As shown in FIG. 3, the navigation device 1 according to the present embodiment includes a current location detecting part 31 that detects a current location of the vehicle having the navigation device 1 mounted thereon; a data recording part 32 having various types of data recorded therein; a navigation ECU 33 that performs various types of arithmetic processing based on inputted information; an operating part 34 that accepts operations from a user; a liquid crystal display 35 that displays to the user a map of an area around the vehicle, information about a guidance route (a planned travel route of the vehicle) set on the navigation device 1, etc.; a speaker 36 that outputs voice guidance about route guidance; a DVD drive 37 that reads a DVD which is a storage medium; and a communication module 38 that performs communication with information centers such as a probe center and a VICS center. In addition, an exterior camera 39 and various types of sensors that are installed on the vehicle having the navigation device 1 mounted thereon are connected to the navigation device 1 through an in-vehicle network such as a CAN. Furthermore, the navigation device 1 is also connected to a vehicle control ECU 40 that performs various types of control on the vehicle having the navigation device 1 mounted thereon, such that the navigation device 1 and the vehicle control ECU 40 can perform two-way communication.

The components included in the navigation device 1 will be described in turn below.

The current location detecting part 31 includes a GPS 41, a vehicle speed sensor 42, a steering sensor 43, a gyro sensor 44, etc., and can detect the current vehicle location and orientation, a vehicle's travel speed, a current time, etc. Here, particularly, the vehicle speed sensor 42 is a sensor for detecting a vehicle's moving distance and vehicle speed, and generates pulses according to the rotation of vehicle's drive wheels and outputs a pulse signal to the navigation ECU 33. Then, the navigation ECU 33 counts the generated pulses, thereby calculating the rotational speed of the drive wheels and a moving distance. Note that the navigation device 1 does not need to include all of the above-described four types of sensors, and may be configured to include only one or a plurality of types of sensors among these sensors.

In addition, the data recording part 32 includes a hard disk (not shown) serving as an external storage device and a recording medium; and a recording head (not shown) which is a driver for reading a map information DB 45 recorded on the hard disk, a cache 46, a predetermined program, etc., and for writing predetermined data to the hard disk. Note that the data recording part 32 may include a flash memory, a memory card, or an optical disc such as a CD or a DVD, instead of a hard disk. Note also that, in the present embodiment, as described above, the server device 4 searches for a route to a destination, and thus, the map information DB 45 may be omitted. Even if the map information DB 45 is omitted, it is also possible to obtain map information from the server device 4 as necessary.

Here, the map information DB 45 is storage means having stored therein, for example, link data about roads (links), node data about node points, search data used in processes related to a route search or change, facility data about facilities, map display data for displaying a map, intersection data about each intersection, and retrieval data for retrieving a point.

Meanwhile, the cache 46 is storage means for saving high-precision map information 16, facility information 17, connection information 18, and outside-the-road geometry information 19 that have been delivered from the server device 4 in the past. A saving period can be set as appropriate, and may be, for example, a predetermined period (e.g., one month) after storage or a period until a vehicle's ACC power supply (accessory power supply) is turned off. In addition, after the amount of data stored in the cache 46 has reached an upper limit, the data may be sequentially deleted in order of oldest to newest. The navigation ECU 33 generates various types of assistance information about autonomous driving assistance, using the high-precision map information 16, facility information 17, connection information 18, and outside-the-road geometry information 19 stored in the cache 46. Details will be described later.

Meanwhile, the navigation ECU (electronic control unit) 33 is an electronic control unit that performs overall control of the navigation device 1, and includes a CPU 51 serving as a computing device and a control device; and internal storage devices such as a RAM 52 that is used as a working memory when the CPU 51 performs various types of arithmetic processing and that stores route data obtained when a route is searched, etc., a ROM 53 having recorded therein a program for control, an autonomous driving assistance program (see FIG. 4) which will be described later, etc., and a flash memory 54 that stores a program read from the ROM 53. Note that the navigation ECU 33 has various types of means serving as processing algorithms. For example, intra-parking-lot network obtaining means obtains, when the vehicle is parked in a parking lot, an intra-parking-lot network which is a network representing routes that can be selected by the vehicle in the parking lot. Candidate entry path obtaining means generates and obtains, using the intra-parking-lot network and based on a first condition, a candidate entry path which is a candidate for a vehicle's travel path from an entrance to the parking lot to a parking location where the vehicle is parked. Condition determining means determines whether or not the candidate entry path satisfies conditions for suitability indicating suitability as a vehicle's travel path. Travel path modifying means modifies, when the condition determining means has determined that the conditions for suitability are not satisfied, the candidate entry path determined not to satisfy the conditions for suitability, based on a second condition different from the first condition. Driving assistance means provides driving assistance based on the modified candidate entry path.

The operating part 34 is operated, for example, upon inputting a point of departure which is a travel start point and a destination which is a travel end point, and includes a plurality of operating switches such as various types of keys and buttons (not shown). Based on a switch signal outputted by, for example, depression of a given switch, the navigation ECU 33 performs control to perform a corresponding one of various types of operation. Note that the operating part 34 may include a touch panel provided on the front of the liquid crystal display 35. Note also that the operating part 34 may include a microphone and a voice recognition device.

In addition, on the liquid crystal display 35 there are displayed a map image including roads, traffic information, operation guidance, an operation menu, guidance on keys, information on guidance along a guidance route (planned travel route), news, weather forecasts, time, e-mails, TV programs, etc. Note that instead of the liquid crystal display 35, a HUD or an HMD may be used.

In addition, the speaker 36 outputs voice guidance that provides guidance on travel along a guidance route (planned travel route) or guidance on traffic information, based on an instruction from the navigation ECU 33.

In addition, the DVD drive 37 is a drive that can read data recorded on a recording medium such as a DVD or a CD. Based on the read data, for example, music or video is played back or the map information DB 45 is updated. Note that instead of the DVD drive 37, a card slot for performing reading and writing on a memory card may be provided.

In addition, the communication module 38 is a communication device for receiving traffic information, probe information, weather information, etc., that are transmitted from traffic information centers, e.g., a VICS center and a probe center, and corresponds, for example, to a mobile phone or a DCM. In addition, the communication module 38 also includes a vehicle-to-vehicle communication device that performs communication between vehicles and a roadside-device-to-vehicle communication device that performs communication with a roadside device. In addition, the communication module 38 is also used to transmit and receive route information searched by the server device 4, high-precision map information 16, facility information 17, connection information 18, and outside-the-road geometry information 19 to/from the server device 4.

In addition, the exterior camera 39 includes, for example, a camera that uses a solid-state imaging device such as a CCD, and is attached to the upper side of a vehicle's front bumper and is placed such that its optical-axis direction faces downward at a predetermined angle relative to the horizontal. When the vehicle travels on an autonomous driving section, the exterior camera 39 captures an image of an area ahead in a traveling direction of the vehicle. In addition, the navigation ECU 33 performs image processing on the captured image having been captured, thereby detecting markings painted on a road on which the vehicle travels, or obstacles such as other vehicles around the vehicle, and generates various types of assistance information about autonomous driving assistance, based on results of the detection. For example, when an obstacle has been detected, a new travel path in which the vehicle travels avoiding or following the obstacle is generated. Note that the exterior camera 39 may be configured to be disposed on the rear or side of the vehicle other than the front. Note also that for means for detecting obstacles, a sensor such as millimeter-wave radar or a laser sensor, vehicle-to-vehicle communication, or roadside-device-to-vehicle communication may be used instead of a camera.

In addition, the vehicle control ECU 40 is an electronic control unit that controls the vehicle having the navigation device 1 mounted thereon. In addition, vehicle's driving parts such as steering, a brake, and an accelerator are connected to the vehicle control ECU 40, and in the present embodiment, particularly, after the vehicle starts autonomous driving assistance, each driving part is controlled, by which autonomous driving assistance for the vehicle is provided. In addition, when an override has been performed by the user during autonomous driving assistance, the fact that the override has been performed is detected.

Here, the navigation ECU 33 transmits, after starting traveling, various types of assistance information about autonomous driving assistance generated by the navigation device 1 to the vehicle control ECU 40 through the CAN. Then, the vehicle control ECU 40 provides autonomous driving assistance to be provided after starting traveling, using the received various types of assistance information. The assistance information includes, for example, a travel path recommended for the vehicle to travel along and a speed plan indicating vehicle speeds at which the vehicle travels.

Figure 4:
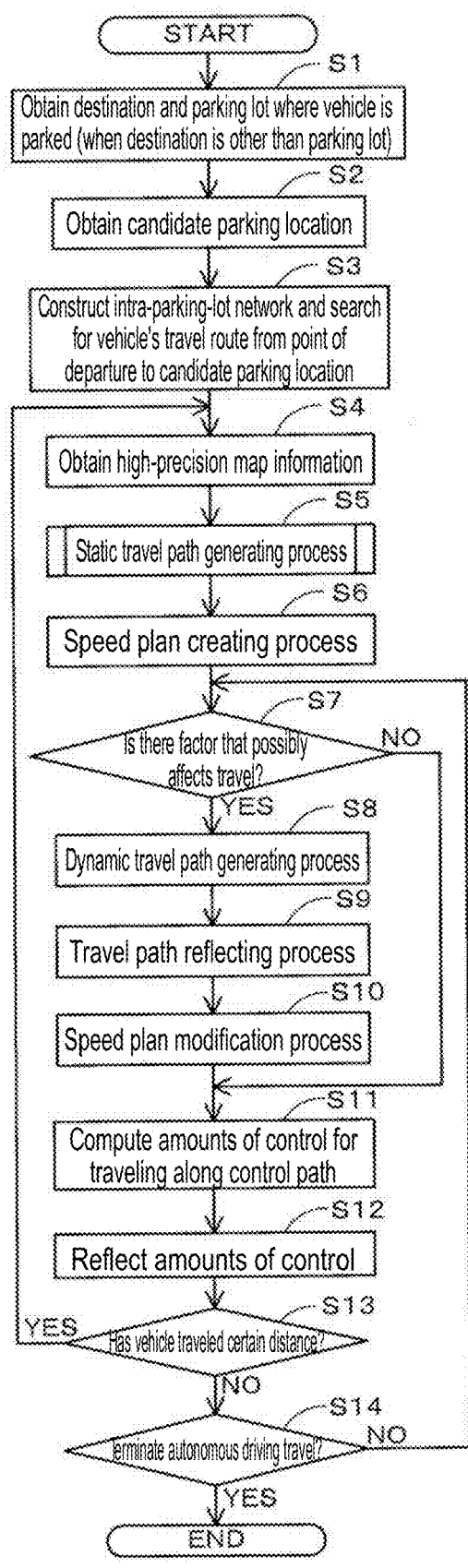
FIG. 4 is a flowchart of an autonomous driving assistance program according to the present embodiment.
Figure 9:
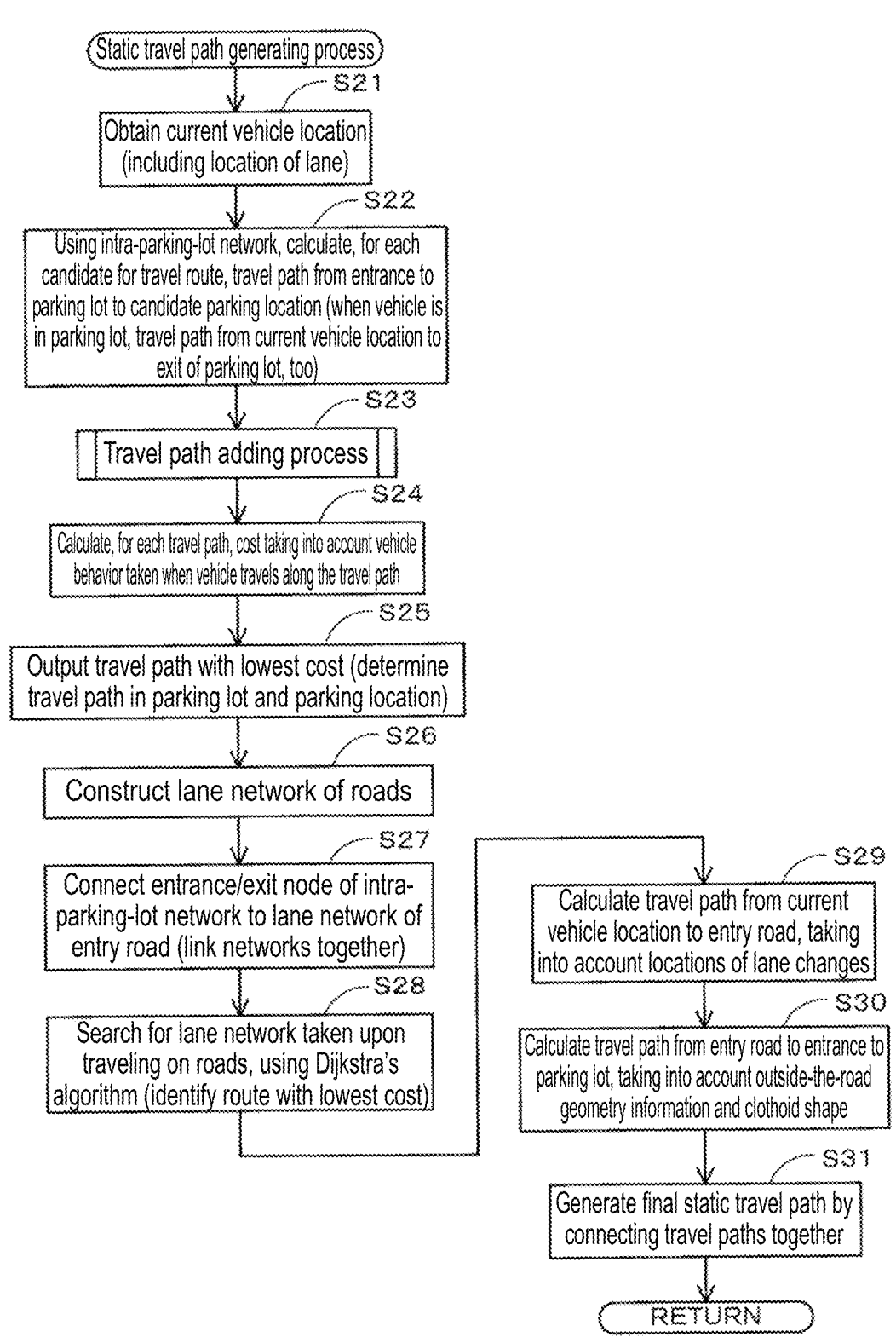
FIG. 9 is a flowchart of a subprocess program of a static travel path generating process.
Figure 17:
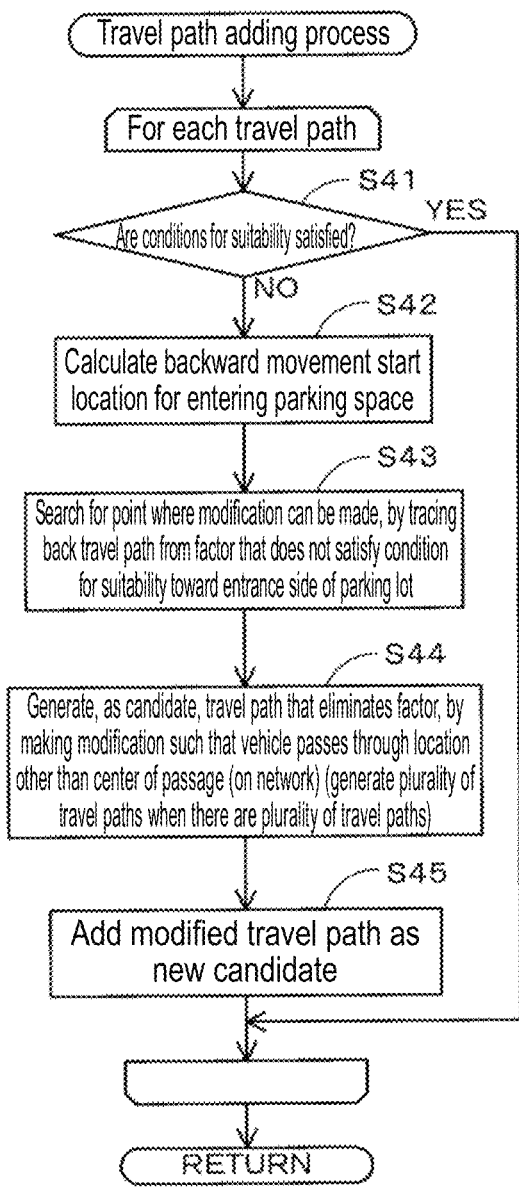
FIG. 17 is a flowchart of a subprocess program of a travel path adding process.

Next, an autonomous driving assistance program executed by the CPU 51 in the navigation device 1 according to the present embodiment that has the above-described configuration will be described based on FIG. 4. FIG. 4 is a flowchart of the autonomous driving assistance program according to the present embodiment. Here, the autonomous driving assistance program is a program that is executed after the vehicle's ACC power supply (accessory power supply) is turned on and when vehicle's travel by autonomous driving assistance has started, and that performs assistance travel by autonomous driving assistance in accordance with assistance information generated by the navigation device 1. In addition, a program shown in flowcharts of the following FIGS. 4, 9, and 17 is stored in the RAM 52 or the ROM 53 included in the navigation device 1, and is executed by the CPU 51.

First, in the autonomous driving assistance program, at step (hereinafter, abbreviated as S) 1, the CPU 51 obtains a destination which is a user's movement target. Basically, the destination is set by a user's operation accepted by the navigation device 1. Note that the destination may be a parking lot or may be a point other than a parking lot. Note, however, that when a point other than a parking lot is the destination, a parking lot where the user parks the vehicle at the destination is also obtained together with the destination. When the destination has a dedicated parking lot or an associated parking lot, the parking lot is a parking lot where the user parks the vehicle. On the other hand, when there is no dedicated parking lot or associated parking lot, a parking lot present around the destination is a parking lot where the user parks the vehicle. Note that when there are a plurality of candidates for a parking lot, all parking lots which are the candidates may be obtained as a parking lot where the user parks the vehicle, or any one of the parking lots selected by the user may be obtained as a parking lot where the user parks the vehicle.

Then, at S2, the CPU 51 obtains a candidate for a parking location (parking space) that is recommended for the user to park the vehicle in the parking lot in which the user parks the vehicle and which is obtained at the above-described S1. Specifically, information on open parking spaces is obtained from a server that manages the parking lot, and a parking space that is easy for the user to stop the vehicle (e.g., a parking space near an entrance to the parking lot, a parking space near an entrance to the destination, or a parking space with no other vehicles parked on the left and right sides thereof) is determined to be a candidate for a parking location recommended for the user to park the vehicle, from among the open parking spaces in the parking lot. Note that all open parking spaces in the parking lot may be determined to be candidates for a parking location.

Subsequently, at S3, the CPU 51 searches for a vehicle's recommended travel route from a current vehicle location to the candidate for a parking location obtained at the above-described S2 (hereinafter, referred to as candidate parking location). In the present embodiment, the search for a travel route at the above-described S3 is performed, particularly, by the server device 4. When a search for a travel route is performed, first, the CPU 51 transmits a route search request to the server device 4. Note that the route search request includes a terminal ID that identifies the navigation device 1 which is a sender of the route search request; and information that identifies a point of departure (e.g., a current vehicle location) and the candidate parking location obtained at the above-described S2. Thereafter, the CPU 51 receives searched-route information transmitted from the server device 4 in response to the route search request. The searched-route information is information that identifies a recommended travel route from the point of departure to the candidate parking location (e.g., a series of links included in the travel route) that is searched by the server device 4 based on the transmitted route search request and using the latest version of map information. The search is performed using, for example, the publicly known Dijkstra's algorithm.

In addition, when the server device 4 searches for, particularly, a recommended travel route in the parking lot from the entrance to the parking lot to the candidate parking location at the above-described S3, the server device 4 constructs, using the facility information 17 stored in the facility DB 14, links and nodes (construction of an intra-parking-lot network), targeting within the parking lot where the user parks the vehicle, in the same manner as for roads. The facility information 17 includes information that identifies the location of an entrance/exit of the parking lot, information that identifies a layout of parking spaces in the parking lot, information about markings that mark off the parking spaces, information about passages through which the vehicle and pedestrians can pass, information about crosswalks and passage spaces provided for pedestrians, etc. By identifying, using those pieces of information, routes that can be selected by the vehicle in the parking lot, an intra-parking-lot network is constructed. Note that the above-described intra-parking-lot network may be constructed in advance for each parking lot across the country and stored in the facility DB 14.

Figure 5:
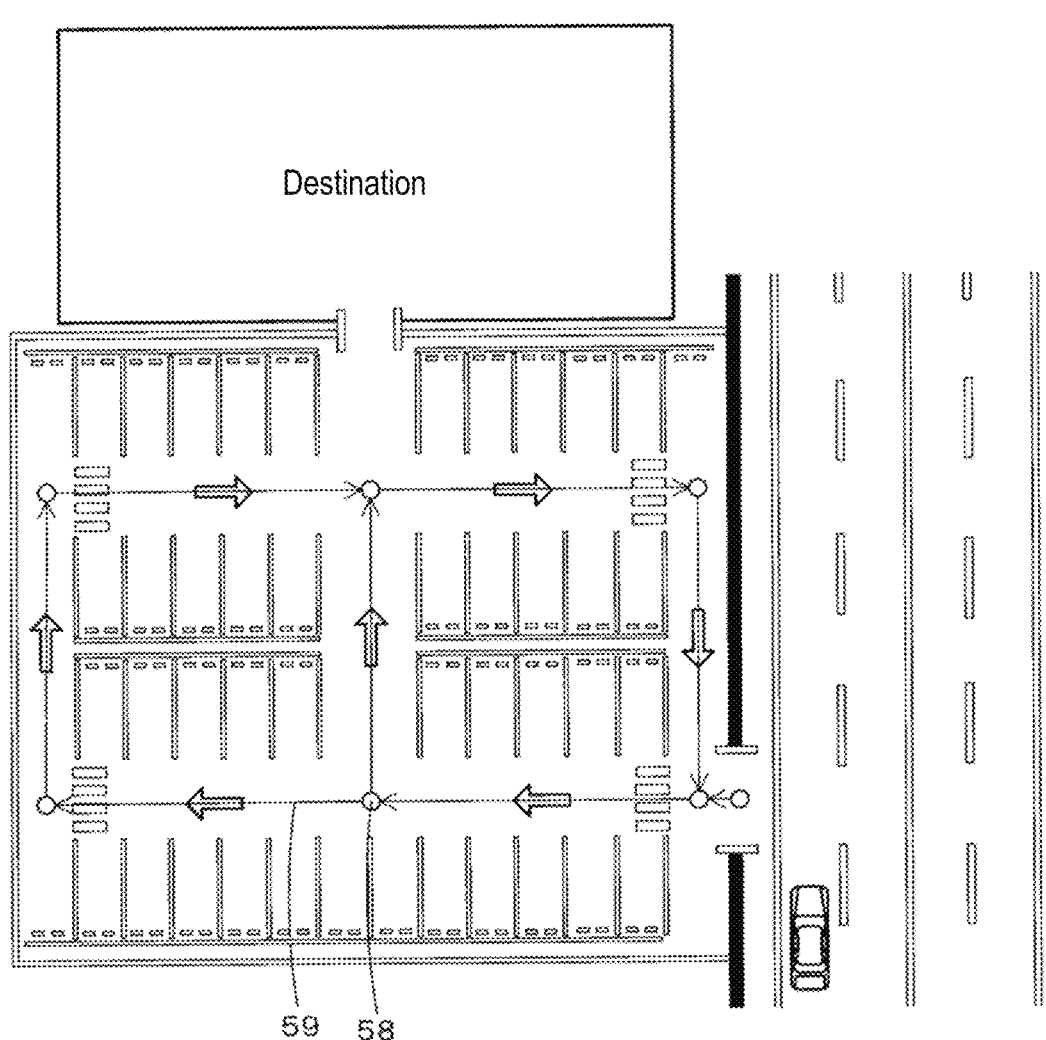
FIG. 5 is a diagram showing an example of an intra-parking-lot network constructed in a parking lot where a vehicle is parked.

Here, an example of an intra-parking-lot network which is constructed for the parking lot at the above-described S3 is shown in FIG. 5. As shown in FIG. 5, a parking lot node 58 is set at each of the entrance/exit of the parking lot, an intersection at which passages through which the vehicle can pass intersect each other, a curved corner of a passage through which the vehicle can pass (i.e., a connecting point between passages), and an end point of a passage. On the other hand, a parking lot link 59 is set on a passage between parking lot nodes 58 through which the vehicle can pass. Basically, the parking lot link 59 is set at the center of the passage. Note that the parking lot link 59 is allowed to cross a region that allows passage of the vehicle when there are no pedestrians in the region, such as a crosswalk or a passage space provided for pedestrians. In addition, the parking lot link 59 also has information that identifies a direction in which the vehicle can pass through the passage in the parking lot. For example, FIG. 5 shows an example in which the vehicle can pass through passages in the parking lot only in a clockwise direction.

In addition, a cost and a direction (a direction in which the vehicle can pass through a parking lot node) are set for each of the parking lot nodes 58 and parking lot links 59 constructed as shown in FIG. 5, in the same manner as for links of roads. For example, for each of parking lot nodes 58 corresponding to an intersection and the entrance/exit of the parking lot, a cost determined based on the type of the parking lot node 58 is set, and a direction in which the vehicle can pass through upon passing through the parking lot node 58 is set. Furthermore, for each of the parking lot links 59, a cost is set using, as a reference value, time required for the vehicle to move on the link or the length of the link. Namely, a higher cost is calculated for a parking lot link 59 with a longer time or distance required for movement thereon.

Furthermore, for a case in which the current vehicle location is, particularly, in the parking lot and the destination is outside the parking lot, when the server device 4 searches for a recommended travel route in the parking lot from the current vehicle location to an exit of the parking lot, too, the server device 4 constructs an intra-parking-lot network such as that shown in FIG. 5, targeting the parking lot where the vehicle is currently located.

Figure 6:
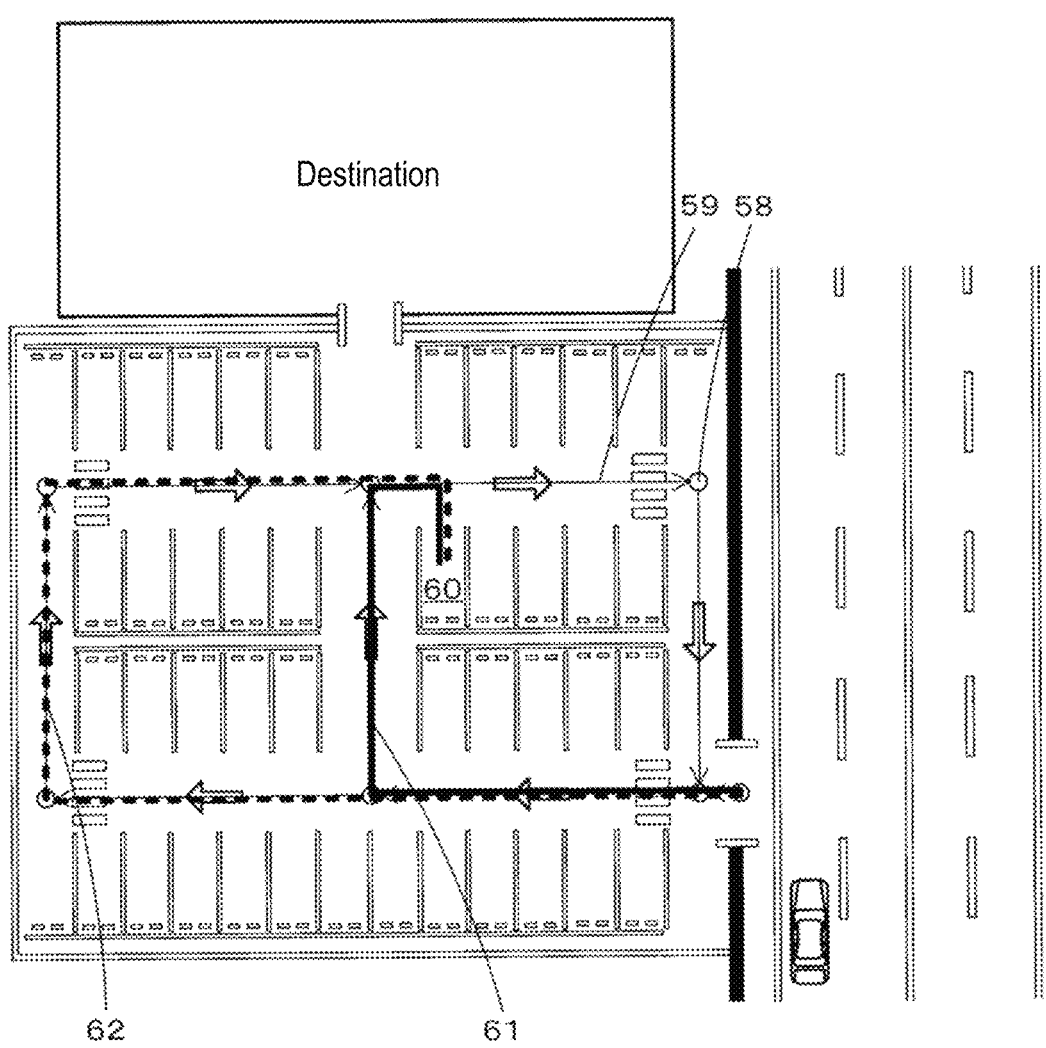
FIG. 6 is a diagram showing examples of a travel route to a candidate parking location where the vehicle is parked.

Thereafter, the server device 4 calculates, using Dijkstra's algorithm, a total of costs to reach the candidate parking location from the current vehicle location via the entrance to the parking lot (also via the exit of the parking lot when the current vehicle location is in the parking lot and the destination is outside the parking lot), and determines a route with the smallest total value to be a vehicle's recommended travel route. Note, however, that instead of identifying only one recommended travel route, particularly, when there are a plurality of candidates for a travel route in the parking lot, the plurality of candidates are obtained as vehicle's recommended travel routes. For example, as shown in FIG. 6, when a parking space 60 present near an entrance to a destination is a recommended parking location, there are a travel route 61 in which the vehicle travels straight from an entrance to a parking lot and turns right near the middle of a passage, and a travel route 62 in which the vehicle travels straight from the entrance to the parking lot until the end of the passage and turns right to go around. For such a case, as will be described later, a determination as to which one of the travel routes is appropriate is made by generating and comparing actual travel paths, and thus, it is desirable to obtain both travel routes as recommended travel routes in the stage of S3. Furthermore, when there are a plurality of candidate parking locations, for each candidate parking location, a vehicle's recommended travel route from the entrance to the parking lot to the candidate parking location is obtained. Note that when there are a plurality of candidates for a recommended travel route from the entrance to the parking lot to the candidate parking location (when the current vehicle location is in the parking lot, a case is also included in which there are a plurality of candidates for a recommended travel route from the current location to the exit of the parking lot), a specific travel path is generated for each travel route in a static travel path generating process (S5) which will be described later (a plurality of travel paths may be generated for one travel route), and a final travel route is determined from among the plurality of routes by comparing the generated travel paths.

Note that when a traveling direction in which the vehicle can enter the parking lot from a road facing the entrance to the parking lot where the user parks the vehicle (hereinafter, referred to as entry road) is limited (e.g., only an entry by a left turn is allowed) which is found out by referring to connection information 18 indicating a connection relationship between a lane included in the entry road and the entrance to the parking lot, the server device 4 performs the above-described search for a travel route, taking also into account the entry direction. Note that for a method of searching for a route, search means other than Dijkstra's algorithm may be used. Note also that the search for a travel route at the above-described S3 may be performed by the navigation device 1 instead of the server device 4.

Then, at S4, the CPU 51 obtains high-precision map information 16, targeting areas including the vehicle's travel route obtained at the above-described S3.

Figure 7:
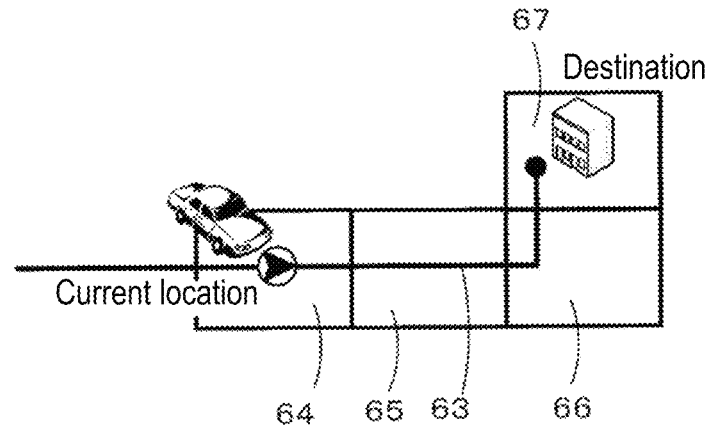
FIG. 7 is a diagram showing areas for which high-precision map information is obtained.

Here, the high-precision map information 16 is, as shown in FIG. 7, sectioned into rectangular shapes (e.g., 500 m×1 km) and stored in the high-precision map DB 13 of the server device 4. Thus, for example, as shown in FIG. 7, when a route 63 is obtained as a vehicle's travel route, high-precision map information 16 is obtained targeting areas 64 to 67 that include the route 63. Note, however, that when the distance to a parking lot where the user parks the vehicle is particularly far, for example, high-precision map information 16 may be obtained targeting only a secondary mesh in which the vehicle is currently located, or high-precision map information 16 may be obtained targeting only areas within a predetermined distance (e.g., within 3 km) from the current vehicle location.

The high-precision map information 16 includes, for example, information about the lane geometries of roads and markings (centerlines, lane lines, edge lines, guidelines, etc.) painted on the roads. In addition to the information, the high-precision map information 16 also includes information about intersections, information about parking lots, etc. The high-precision map information 16 is basically obtained in units of the above-described rectangular areas from the server device 4, but when the cache 46 already has stored therein high-precision map information 16 for an area, the high-precision map information 16 is obtained from the cache 46. In addition, the high-precision map information 16 obtained from the server device 4 is temporarily stored in the cache 46.

In addition, at the above-described S4, the CPU 51 also obtains facility information 17, targeting the parking lot in which the user parks the vehicle and which is identified at the above-described S1. Furthermore, the CPU 51 also likewise obtains connection information 18 indicating a connection relationship between a lane included in an entry road facing the entrance to the parking lot where the user parks the vehicle and the entrance to the parking lot, and outside-the-road geometry information 19 that identifies a region, through which the vehicle can pass, between the entry road and the entrance to the parking lot where the user parks the vehicle.

The facility information 17 includes, for example, information that identifies the location of the entrance/exit of the parking lot, information that identifies a layout of parking spaces in the parking lot, information about markings that mark off the parking spaces, information about passages through which the vehicle and pedestrians can pass, and information about crosswalks in the parking lot and passage spaces provided for pedestrians. The facility information 17 may be, particularly, information generated by 3D modeling of the parking lot. In addition, the facility information 17, the connection information 18, and the outside-the-road geometry information 19 are basically obtained from the server device 4, but when corresponding information is already stored in the cache 46, the information is obtained from the cache 46. In addition, the facility information 17, connection information 18, and outside-the-road geometry information 19 obtained from the server device 4 are temporarily stored in the cache 46.

Thereafter, at S5, the CPU 51 performs a static travel path generating process (FIG. 9) which will be described later. Here, in the static travel path generating process, for the vehicle's recommended travel route from the current vehicle location to the candidate parking location which is searched at the above-described S3, a travel path recommended upon traveling on the travel route is generated. When there are a plurality of candidates for a travel route, the most recommended travel path is selected by comparing travel paths for the respective travel routes (i.e., one travel route is also determined). A static travel path is generated based on the high-precision map information 16, facility information 17, connection information 18, and outside-the-road geometry information 19 obtained at the above-described S4, and a parking location where the vehicle is parked is also determined by the generated static travel path from among the candidate parking locations obtained at the above-described S2. Note that the static travel path includes, as will be described later, a first travel path recommended for the vehicle to travel along in lanes from a travel start point to the entry road facing the entrance to the parking lot at the destination (when the current vehicle location is in the parking lot, there are included a travel path recommended for the vehicle to travel along from the current vehicle location to the exit of the parking lot and a travel path recommended for the vehicle to travel along from the exit of the parking lot to the entry road facing the entrance to the parking lot at the destination); a second travel path recommended for the vehicle to travel along from the entry road to the entrance to the parking lot; and a third travel path recommended for the vehicle to travel along from the entrance to the parking lot to the parking location (parking space) where the vehicle is parked. Note, however, that when the distance to the parking lot where the user parks the vehicle is particularly far, only a first travel path may be generated targeting a section from the current vehicle location to a location a predetermined distance ahead in a traveling direction (e.g., within a secondary mesh in which the vehicle is currently located). Note that the predetermined distance can be changed as appropriate, and a static travel path is generated targeting a region including at least an area outside an area (detection area) in which road conditions around the vehicle can be detected by the exterior camera 39 and other sensors.

Then, at S6, the CPU 51 creates a vehicle's speed plan used upon traveling along the static travel path generated at the above-described S5, based on the high-precision map information 16 obtained at the above-described S4. For example, vehicle's travel speeds recommended upon traveling along the static travel path are calculated taking into account speed limit information and speed change points (e.g., intersections, curves, railroad crossings, and crosswalks) present on a planned travel route.

Then, the speed plan created at the above-described S6 is stored in the flash memory 54, etc., as assistance information used for autonomous driving assistance. In addition, an acceleration plan indicating acceleration and deceleration of the vehicle required to implement the speed plan created at the above-described S6 may also be created as assistance information used for autonomous driving assistance.

Subsequently, at S7, the CPU 51 determines, as road conditions around the vehicle, particularly, whether or not a factor that affects vehicle's travel is present around the vehicle, by performing image processing on a captured image having been captured with the exterior camera 39. Here, the "factor that affects vehicle's travel" to be determined at the above-described S7 is a dynamic factor that changes in real time, and static factors based on road structures are excluded. The factor that affects vehicle's travel corresponds, for example, to another vehicle that travels or is parked ahead in a traveling direction of the vehicle, a pedestrian located ahead in the traveling direction of the vehicle, or a construction zone present ahead in the traveling direction of the vehicle. On the other hand, intersections, curves, railroad crossings, merge areas, lane reduction areas, etc., are excluded. In addition, even if there is another vehicle, a pedestrian, or a construction zone, if there is no possibility of them overlapping a vehicle's future travel path (e.g., if they are located away from the vehicle's future travel path), then they are excluded from the "factor that affects vehicle's travel". In addition, for means for detecting a factor that possibly affects vehicle's travel, a sensor such as millimeter-wave radar or a laser sensor, vehicle-to-vehicle communication, or roadside-device-to-vehicle communication may be used instead of a camera.

In addition, for example, the real-time locations of vehicles traveling on roads across the country, etc., may be managed by an external server, and the CPU 51 may obtain the location of another vehicle located around the vehicle from the external server to perform the determination process at the above-described S7.

If it is determined that a factor that affects vehicle's travel is present around the vehicle (S7: YES), then processing transitions to S8. On the other hand, if it is determined that a factor that affects vehicle's travel is not present around the vehicle (S7: NO), then processing transitions to S11.

Figure 8:
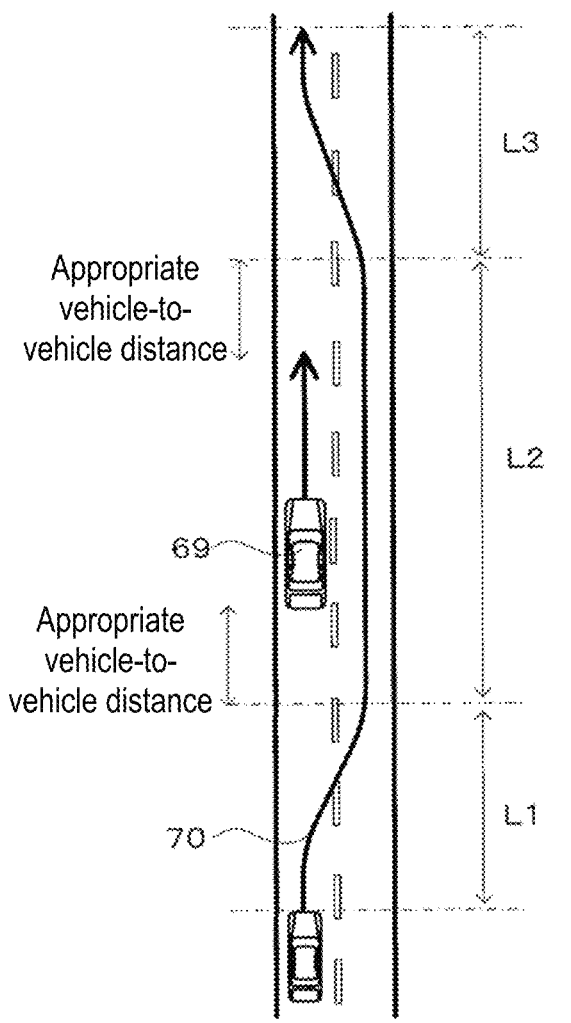
FIG. 8 is a diagram that describes a method of calculating a dynamic travel path.

At S8, the CPU 51 generates, as a dynamic travel path, a new path for the vehicle to travel from the current vehicle location, avoiding or following the "factor that affects vehicle's travel" detected at the above-described S7, and back to the static travel path. Note that the dynamic travel path is generated targeting a section including the "factor that affects vehicle's travel". Note also that the length of the section varies depending on what the factor is. For example, when the "factor that affects vehicle's travel" is another vehicle (vehicle ahead) traveling ahead of the vehicle, as shown in FIG. 8, an avoidance path which is a path in which the vehicle makes a lane change to the right to pass a vehicle ahead 69, and then makes a lane change to the left to move back into an original lane is generated as a dynamic travel path 70. Note that a following path which is a path in which the vehicle travels following the vehicle ahead 69 from behind at a predetermined distance without passing the vehicle ahead 69 (or travels side by side with the vehicle ahead 69) may be generated as a dynamic travel path.

A method of calculating the dynamic travel path 70 shown in FIG. 8 will be described as an example. The CPU 51 first calculates a first path L1 required for the vehicle to move into a right lane by starting a turn of the steering and for the steering position to return to a straight-ahead direction. Note that for the first path L1, a path that is as smooth as possible and has the shortest possible distance required for a lane change is calculated using a clothoid curve or an arc on conditions that lateral acceleration (lateral G) occurring upon making a lane change does not interfere with autonomous driving assistance and does not exceed an upper limit value (e.g., 0.2 G) at which a vehicle's passenger is not given discomfort, the lateral G being calculated based on the current vehicle speed of the vehicle. In addition, another condition is that an appropriate vehicle-to-vehicle distance D or more is maintained between the vehicle and the vehicle ahead 69.

Then, a second path L2 is calculated in which the vehicle travels in the right lane with a speed limit being an upper limit, to pass the vehicle ahead 69 and travels until an appropriate vehicle-to-vehicle distance D or more is obtained between the vehicle and the vehicle ahead 69. Note that the second path L2 is basically a straight path, and the length of the path is calculated based on the vehicle speed of the vehicle ahead 69 and the speed limit for the road.

Subsequently, a third path L3 is calculated that is required for the vehicle to move back into the left lane by starting a turn of the steering and for the steering position to return to the straight-ahead direction. Note that for the third path L3, a path that is as smooth as possible and has the shortest possible distance required for a lane change is calculated using a clothoid curve or an arc on conditions that lateral acceleration (lateral G) occurring upon making a lane change does not interfere with autonomous driving assistance and does not exceed an upper limit value (e.g., 0.2 G) at which a vehicle's passenger is not given discomfort, the lateral G being calculated based on the current vehicle speed of the vehicle. In addition, another condition is that an appropriate vehicle-to-vehicle distance D or more is maintained between the vehicle and the vehicle ahead 69.

Note that a dynamic travel path is generated based on road conditions around the vehicle which are obtained using the exterior camera 39 and other sensors, and thus, a region for which a dynamic travel path is to be generated is at least within an area (detection area) in which road conditions around the vehicle can be detected using the exterior camera 39 and other sensors.

Subsequently, at S9, the CPU 51 reflects the dynamic travel path which is newly generated at the above-described S8 in the static travel path generated at the above-described S5. Specifically, a cost is calculated for a portion of each of the static travel path and the dynamic travel path from the current vehicle location to the end of a section including the "factor that affects vehicle's travel", and a travel path with the lowest cost is selected. Consequently, a part of the static travel path is replaced by the dynamic travel path as necessary. Note that depending on the situation, replacement by the dynamic travel path may not be performed, i.e., even if reflection of the dynamic travel path is performed, there may be no change in the static travel path generated at the above-described S5. Furthermore, when the dynamic travel path and the static travel path are identical paths, even if replacement is performed, there may be no change in the static travel path generated at the above-described S5.

Then, at S10, the CPU 51 modifies, for the static travel path in which the dynamic travel path has been reflected at the above-described S9, the vehicle's speed plan created at the above-described S6, based on a change made by the reflected dynamic travel path. Note that when there is no change in the static travel path generated at the above-described S5 as a result of reflecting the dynamic travel path, the process at S10 may be omitted.

Subsequently, at S11, the CPU 51 computes the amounts of control for the vehicle to travel along the static travel path generated at the above-described S5 (when the dynamic travel path is reflected at the above-described S9, a path obtained after the reflection) at speeds in accordance with the speed plan created at the above-described S6 (when the speed plan is modified at the above-described S10, a plan obtained after the modification). Specifically, each of the amounts of control of an accelerator, a brake, a gear, and steering is computed. Note that the processes at S11 and S12 may be performed by the vehicle control ECU 40 that controls the vehicle, instead of the navigation device 1.

Thereafter, at S12, the CPU 51 reflects the amounts of control computed at S11. Specifically, the computed amounts of control are transmitted to the vehicle control ECU 40 through the CAN. The vehicle control ECU 40 performs vehicle control of each of the accelerator, the brake, the gear, and the steering based on the received amounts of control. As a result, it becomes possible to perform travel assistance control for traveling along the static travel path generated at the above-described S5 (when the dynamic travel path is reflected at the above-described S9, a path obtained after the reflection) at speeds in accordance with the speed plan created at the above-described S6 (when the speed plan is modified at the above-described S10, a plan obtained after the modification).

Then, at S13, the CPU 51 determines whether or not the vehicle has traveled a certain distance since the generation of a static travel path at the above-described S5. For example, the certain distance is 1 km.

If it is determined that the vehicle has traveled a certain distance since the generation of a static travel path at the above-described S5 (S13: YES), then processing returns to S4. Thereafter, a static travel path is generated again, targeting a section within the predetermined distance from a current vehicle location along the travel route (S4 to S6). Note that, in the present embodiment, every time the vehicle has traveled a certain distance (e.g., 1 km), a static travel path is repeatedly generated targeting a section within the predetermined distance from a current vehicle location along the travel route, but when the distance to the destination is short, static travel paths to the destination may be generated at once at the time of starting traveling.

On the other hand, if it is determined that the vehicle has not traveled a certain distance since the generation of a static travel path at the above-described S5 (S13: NO), then it is determined whether or not to terminate the assistance travel by autonomous driving assistance (S14). A case of terminating the assistance travel by autonomous driving assistance includes a case in which the travel by autonomous driving assistance is intentionally canceled (override) by the user operating a control panel provided on the vehicle or by the user performing a steering wheel operation, a brake operation, etc., in addition to a case in which the vehicle has reached the destination.

If it is determined to terminate the assistance travel by autonomous driving assistance (S14: YES), then the autonomous driving assistance program is terminated. On the other hand, if it is determined to continue the assistance travel by autonomous driving assistance (S14: NO), then processing returns to S7.

Next, a subprocess of the static travel path generating process performed at the above-described S5 will be described based on FIG. 9. FIG. 9 is a flowchart of a subprocess program of the static travel path generating process.

First, at S21, the CPU 51 obtains a current vehicle location detected by the current location detecting part 31. Note that it is desirable to specifically identify a current vehicle location using, for example, high-precision GPS information or a high-precision location technique. Here, the high-precision location technique is a technique in which white lines or road surface painting information that is/are captured with a camera installed on the vehicle is/are detected by image recognition, and furthermore, the detected white lines or road surface painting information is/are checked against, for example, high-precision map information 16, by which a driving lane or a high-precision vehicle location can be detected. Furthermore, when the vehicle travels on a road having a plurality of lanes, a lane in which the vehicle travels is also identified. In addition, when the vehicle is located in a parking lot, a specific location in the parking lot (e.g., a parking space where the vehicle is located) is also identified.

At and after the following S22, the CPU 51 calculates, for the vehicle's recommended travel route from the current vehicle location to the candidate parking location which is searched at the above-described S3, a travel path recommended upon traveling on the travel route. In addition, when, particularly, a plurality of routes are searched at the above-described S3 as candidates for a travel route recommended in the parking lot, a travel path is generated for each route, and a final travel route is determined from among the plurality of routes by comparing the generated plurality of travel paths.

First, at S22, the CPU 51 obtains an intra-parking-lot network for the parking lot in which the user parks the vehicle and which is obtained at the above-described S1, and calculates, for each travel route searched at the above-described S3, a travel path (a candidate for a travel path) that can be taken by the vehicle from the entrance to the parking lot through which the vehicle enters the parking lot at the destination (note, however, that when the vehicle is already in the parking lot, the current vehicle location in the parking lot) up to the point where the vehicle is parked in a parking space which is the candidate parking location by moving along the route, using the intra-parking-lot network and the facility information 17. In addition, when the current vehicle location is in the parking lot and the destination is outside the parking lot, an intra-parking-lot network for the parking lot in which the user is located is obtained, and for each travel route searched at the above-described S3, a travel path that can be taken by the vehicle from the current vehicle location up to the point where the vehicle moves to the exit of the parking lot by moving along the route is also likewise calculated using the intra-parking-lot network. Namely, at the above-described S22, a candidate for a travel path for a portion of the travel route searched at the above-described S3 in which the vehicle travels in the parking lot is calculated.

Figure 10:
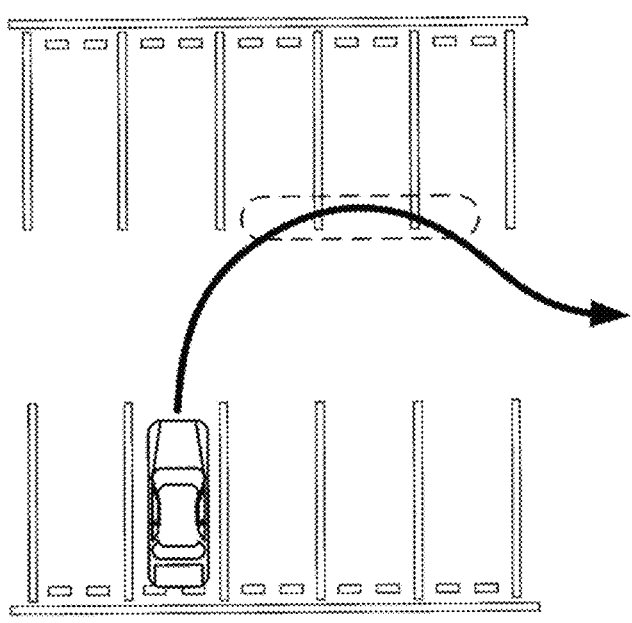
FIG. 10 is a diagram showing an example of excluding from candidates for a travel path in the parking lot.

Note that the intra-parking-lot network is, as described above, a network that identifies routes that can be selected by the vehicle in the parking lot, and includes, as shown in FIG. 5, the parking lot nodes 58 and the parking lot links 59. In addition, the facility information 17 includes information that identifies the location of the entrance/exit of the parking lot, information that identifies a layout of parking spaces in the parking lot, information about markings that mark off the parking spaces, information about passages through which the vehicle and pedestrians can pass, information about crosswalks and passage spaces provided for pedestrians, etc. In addition, upon calculating a travel path, the travel speed in the parking lot is a low speed (e.g., 10 km/h) and the range of turning radius that can be taken by the vehicle is identified based on vehicle data. For a travel path taken upon turning, paths that are connected as smoothly as possible are calculated using a clothoid curve or an arc. Furthermore, basically, when the vehicle travels along a passage, a travel path in which the vehicle travels on the center of the passage (i.e., on a parking lot link 59 of the intra-parking-lot network) is calculated. Particularly, traveling on the center of a passage (i.e., on a parking lot link 59 of the intra-parking-lot network) is a first condition. At the above-described S22, a travel path is generated based on the first condition. In addition, the number of candidates for a travel path to be generated is not limited to one travel path for one travel route, and when there are a plurality of travel paths that can be taken by the vehicle upon traveling along the same travel route, a plurality of travel paths are generated. Note, however, that as shown in FIG. 10, a travel path in which a part of the vehicle body enters parking spaces other than a parking space where the vehicle is parked and parking spaces where the vehicle is to be parked, or a travel path in which a part of the vehicle body enters an area outside the parking lot area (e.g., a public road) is excluded from travel paths to be generated. On the other hand, a travel path is allowed in which a part of the vehicle body enters a region that allows passage of the vehicle if there is no obstacle in the region, like a crosswalk in the parking lot or a passage space provided for pedestrians. Travel paths generated at the above-described S22 include a candidate entry path which is a candidate for a vehicle's travel path from the entrance to the parking lot to the parking location where the vehicle is parked, and a candidate exit path which is a candidate for a vehicle's travel path from the parking location where the vehicle is parked to the exit of the parking lot.

Figure 11:
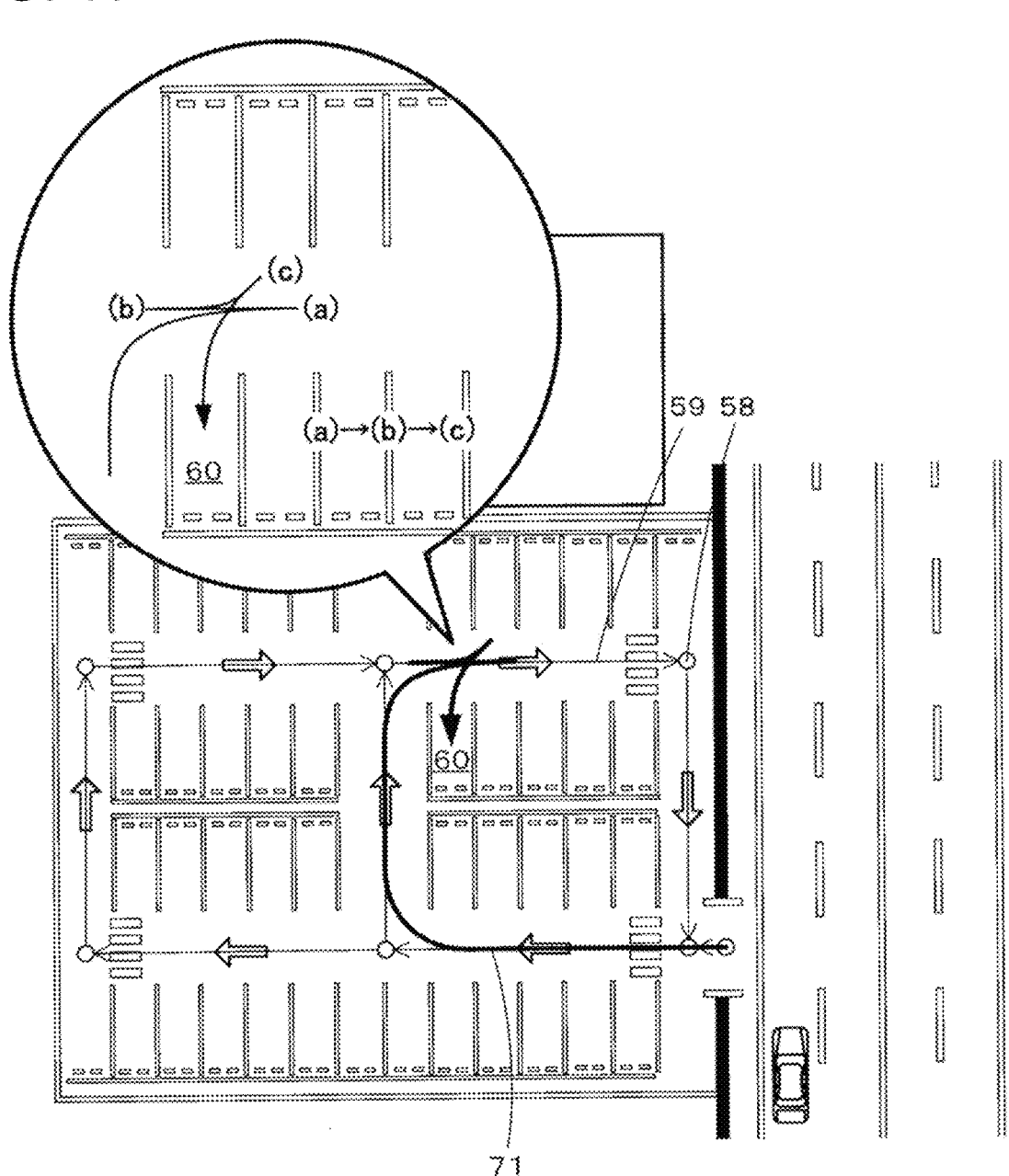
FIG. 11 is a diagram showing an example of a candidate for a travel path to be calculated.
Figure 12:
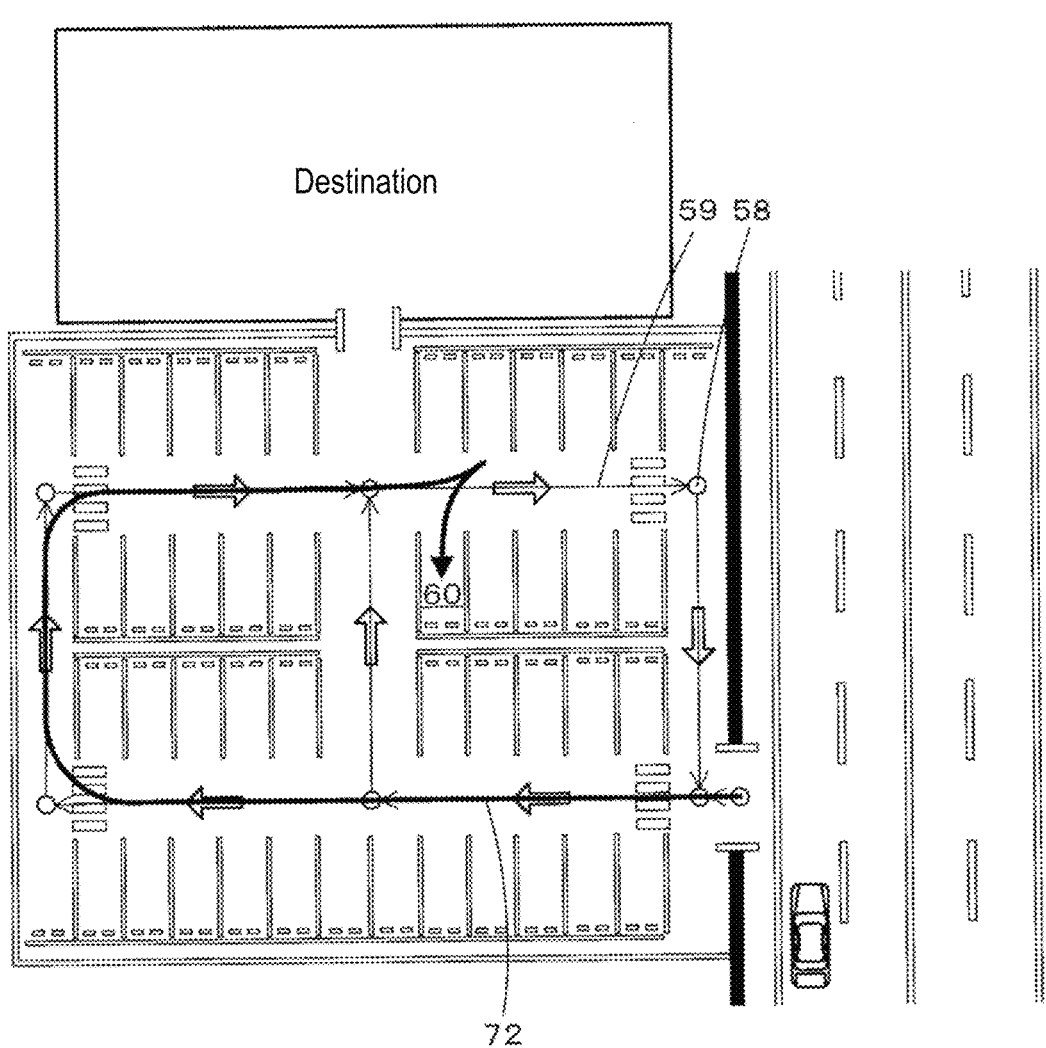
FIG. 12 is a diagram showing an example of a candidate for a travel path to be calculated.

Here, FIG. 11 shows an example of a candidate for a travel path 71 which is calculated for the travel route 61 shown in FIG. 6 in which the vehicle travels straight from the entrance to the parking lot and turns right near the middle of the passage. In addition, FIG. 12 shows an example of a candidate for a travel path 72 which is calculated for the travel route 62 shown in FIG. 6 in which the vehicle travels straight from the entrance to the parking lot until the end of the passage and turns right to go around. As shown in FIGS. 11 and 12, the travel path 71 and the travel path 72 both are travel paths for the vehicle to enter through the same entrance to the parking lot and to be parked in the same parking space 60, but are greatly different in shape. When total lengths are compared, the travel path 71 is shorter, but the travel path 71 requires back-and-forth movements to enter the parking space 60. In addition, for a travel path in which back-and-forth movements occur such as the travel path 71, in many cases, back-and-forth movements occur because of the condition that when the vehicle travels along a passage, the vehicle travels on the center of the passage (i.e., on a parking lot link 59 of the intra-parking-lot network). Thus, the travel path may be able to be modified to a travel path with no back-and-forth movements by shifting a travel location taken when the vehicle travels along a passage to the right or left relative to the center of the passage (i.e., on a parking lot link 59 of the intra-parking-lot network). Hence, in a travel path adding process at subsequent S23 (FIG. 17), a travel path that does not satisfy a condition for suitability as a travel path, such as a travel path with back-and-forth movements, is modified based on a new second condition, excluding the above-described first condition that the vehicle travels on the center of a passage (i.e., on a parking lot link 59 of the intra-parking-lot network), and the modified travel path is also further added as a candidate for a travel path. Details will be described later.

For example, when the travel path 71 and the travel path 72 are calculated as candidates for a travel path at the above-described S22, and furthermore, a new candidate for a travel path obtained by modifying the travel path 71 is added at S23, it is difficult to determine which one of many travel paths is to be a recommended travel path. Hence, as shown below, when a plurality of candidates for a travel path are calculated at the above-described S22 and S23, a cost is calculated for each travel path and the costs are compared.

At S24, the CPU 51 calculates costs required for vehicle's travel, taking into account vehicle behavior taken when the vehicle travels along the candidate for a travel path generated at the above-described S22 and the candidate for a travel path added at the above-described S23. When a plurality of candidates for a travel path are generated, a cost is calculated for each of the plurality of candidates for a travel path. A method of calculating a cost at the above-described S24 will be described in detail below.

Specifically, by adding together costs calculated based on the following elements (1) to (6), a final cost is calculated for each candidate for a travel path.

(1) Moving distance (irrespective of forward or backward movement) . . . Moving distance [m]×1.0

(2) Backward moving distance . . . Moving distance [m]×10.0

(3) Number of shifts from forward movement to backward movement and vice versa . . . Number of shifts× 10.0

(4) Amount of turning angle . . . Turning angle×0.1

(5) Number of changes in steering turning direction . . . Number of changes×5.0

(6) Distance traveled in a conditional traveling-prohibited region . . . Moving distance [m]×10.0

First, for (1), a cost is determined by a moving distance of a travel path. Specifically, a higher cost is calculated for the longer total length of a travel path. Namely, it can be seen that such a travel path is less likely to be selected as a recommended travel path.

On the other hand, for (2), a cost is determined by, particularly, a moving distance that the vehicle moves backward in a travel path. Specifically, a higher cost is calculated for a longer backing distance. Note that compared to (1), the coefficient is 10 times larger, and thus, there is a possibility that a travel path having a short total length but having a long backing distance has a higher cost than a travel path having a long total length.

In addition, for (3), a cost is determined based on the number of shifts from forward movement to backward movement and vice versa included in a travel path. Specifically, a higher cost is calculated for a larger number of shifts from forward movement to backward movement and vice versa. Namely, it can be seen that such a travel path is less likely to be selected as a recommended travel path.

In addition, for (4), a cost is determined based on the amount of vehicle's turning angle required upon traveling along a travel path. Specifically, a higher cost is calculated for a travel path having a larger amount of turning angle, i.e., having a larger amount of steering operation. Namely, it can be seen that such a travel path is less likely to be selected as a recommended travel path.

In addition, for (5), a cost is determined based on the number of changes in steering turning direction included in a travel path. Specifically, a higher cost is calculated for a larger number of changes in steering turning direction. Namely, it can be seen that such a travel path is less likely to be selected as a recommended travel path.

Figure 13:
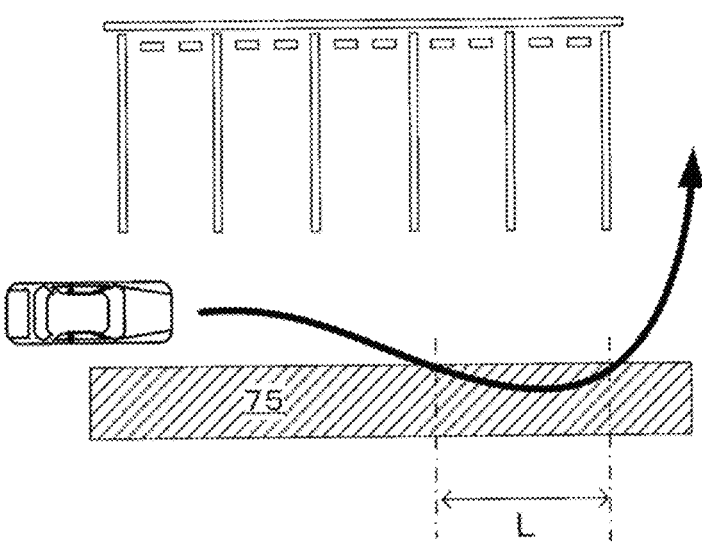
FIG. 13 is a diagram showing an example of a travel path in which the vehicle travels in a conditional traveling-prohibited region.

Finally, for (6), a cost is determined by, particularly, a distance that the vehicle travels in a conditional traveling-prohibited region in a travel path. Specifically, a higher cost is calculated for a longer distance that the vehicle travels in a conditional traveling-prohibited region. Note that basically, it is considered that the vehicle has traveled in a conditional traveling-prohibited region if even a part of the vehicle body has entered the conditional traveling-prohibited region. The term "conditional traveling-prohibited region" used here refers to a region that allows passage of the vehicle if there is no obstacle in the region, whereas not allowing passage of the vehicle in a state in which there is an obstacle in the region. Note that the obstacle is, for example, a pedestrian or a wheelchair. Namely, the "conditional traveling-prohibited region" specifically corresponds to a crosswalk provided in a parking lot or a passage space provided for pedestrians (note, however, that a passage dedicated for pedestrians where vehicle entry is prohibited is excluded). Information that identifies conditional traveling-prohibited regions is included in the facility information 17. For example, as shown in FIG. 13, when a part of a travel path allows the vehicle to travel in a passage space 75 provided for pedestrians, a cost is added based on a distance L that the vehicle travels in the passage space 75. Note that compared to (1), the coefficient is 10 times larger, and thus, there is a possibility that a travel path having a short total length but allowing the vehicle to travel in a conditional traveling-prohibited region has a higher cost than a travel path having a long total length.

Note that when a cost is calculated for a candidate for a travel path at the above-described S24, the cost may be calculated taking into account only some of the above-described elements (1) to (6), instead of taking into account all elements (1) to (6). For example, a total value of the costs (1), (2), (3), and (5) may be calculated.

Thereafter, at S25, the CPU 51 compares the costs for the respective candidates for a travel path calculated at the above-described S24, and selects a travel path for which the lowest cost is calculated among the candidates for a travel path from the entrance to the parking lot at the destination to the parking location where the vehicle is parked, as a vehicle's recommended travel path from the entrance to the parking lot at the destination to the parking location where the vehicle is parked. As a result, a parking location where the vehicle is parked is also determined from among the candidate parking locations obtained at the above-described S2. Specifically, a parking space located at an end point of the selected travel path serves as a parking location where the vehicle is parked. Likewise, when a plurality of candidates for a travel route are obtained at the above-described S3, one travel route is also determined along with the travel path. In addition, when the current vehicle location is in the parking lot and the destination is outside the parking lot, a travel path for which the lowest cost is calculated among candidates for a travel path from the current vehicle location in the parking lot to the exit of the parking lot is selected as a vehicle's recommended travel path from the current vehicle location in the parking lot to the exit of the parking lot.

In addition, in the above-described implementation example, a parking location where the vehicle is parked and a travel path are selected taking into account a burden on vehicle's travel to the destination, but a parking location where the vehicle is parked and a travel path may be selected taking also into account a burden on vehicle's travel performed upon going back home from the destination. For example, at the above-described S22, in addition to an outward travel path from the entrance to the parking lot to the candidate parking location, a return travel path from the candidate parking location to the exit of the parking lot is also obtained. Then, at the above-described S24, a cost may be calculated targeting each of the outward travel path from the entrance to the parking lot to the candidate parking location and the return travel path from the candidate parking location to the exit of the parking lot, and at the above-described S25, a travel path with the smallest total of costs may be selected. As a result, it become possible to select a parking location where the vehicle is parked and a travel path, taking also into account a burden on vehicle's travel performed upon going back home from the destination.

Then, at S26, the CPU 51 constructs a lane network, targeting a portion, where the vehicle travels on roads, of the vehicle's recommended travel route from the current vehicle location to the candidate parking location which is searched at the above-described S3, based on the high-precision map information 16 obtained at the above-described S4. The high-precision map information 16 includes lane geometries, marking information, and information about intersections, and furthermore, the lane geometries and the marking information include, for example, information that identifies the number of lanes, how and at which location the number of lanes increases or decreases when there is an increase or decrease in the number of lanes, a passage segment in a traveling direction for each lane, a connection between roads for each lane (specifically, a correspondence between a lane included in a road before passing through an intersection and a lane included in a road after passing through the intersection), and guidelines (white guidelines) at intersections. The lane network generated at the above-described S26 is a network representing lane-to-lane movements that can be selected by the vehicle when the vehicle travels on the candidate for a travel route searched at the above-described S3. When there are a plurality of candidates for a travel route searched at the above-described S3, the above-described lane network is constructed for the plurality of candidate routes. In addition, the lane network is constructed targeting a section from the current vehicle location (note, however, that when the current vehicle location is in the parking lot, an exit road facing the exit of the parking lot) to an entry road facing the entrance to the parking lot where the user parks the vehicle at the destination.

Figure 14:
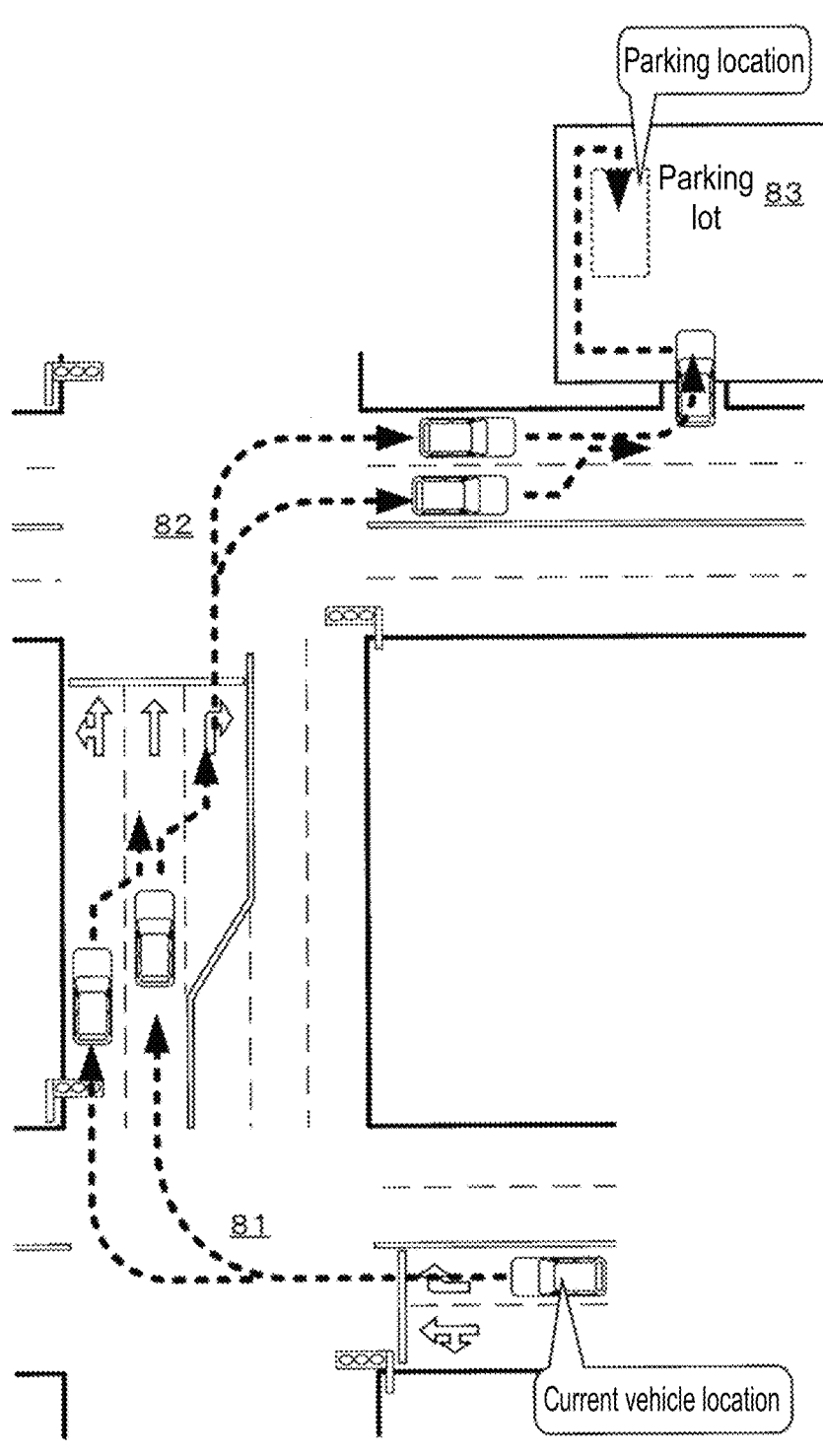
FIG. 14 is a diagram showing an example of a travel route to a parking lot at a destination.
Figure 15:
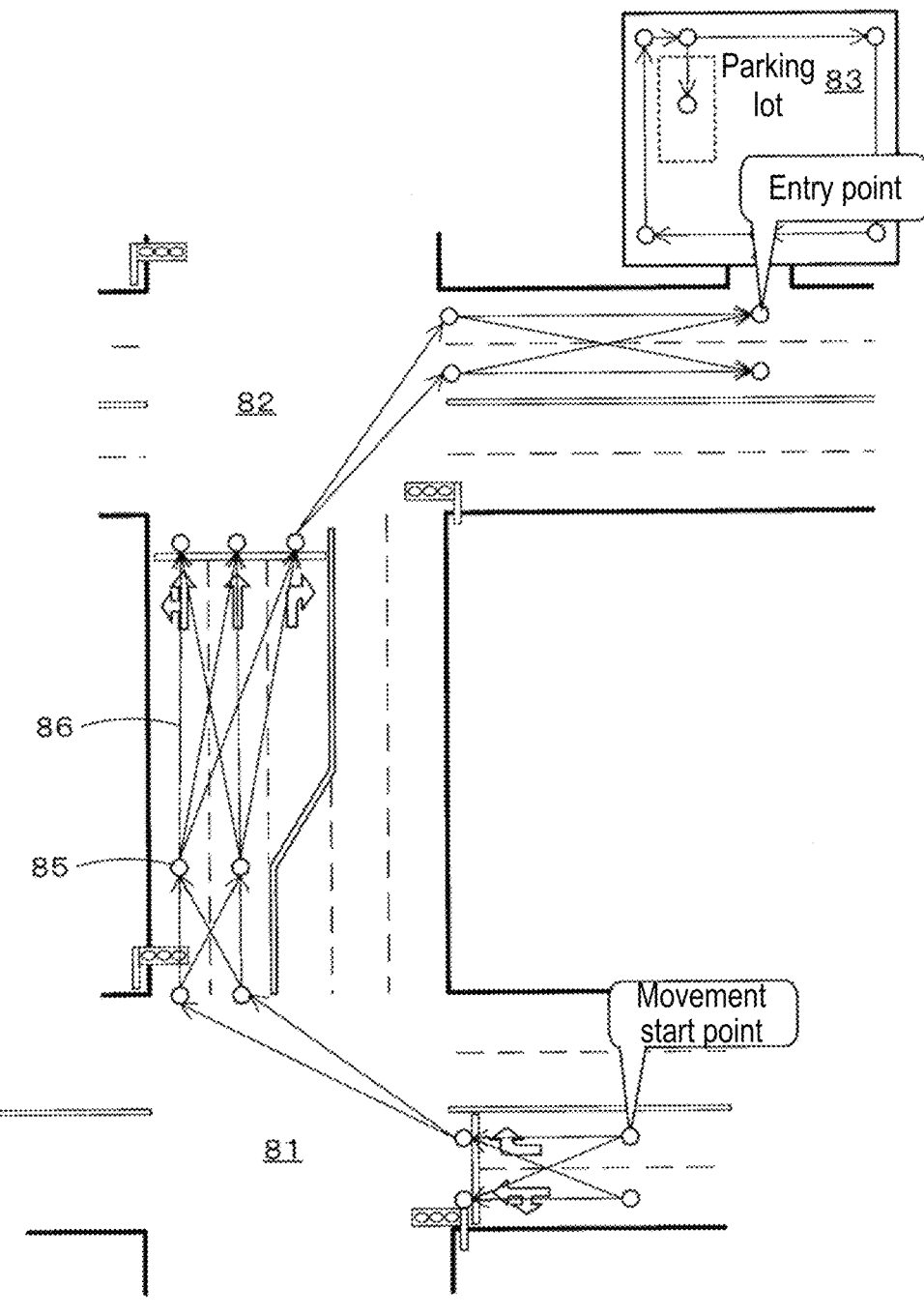
FIG. 15 is a diagram showing an example of a lane network constructed for the travel route shown in FIG. 14.

Here, as an example of constructing a lane network at the above-described S26, for example, a case in which the vehicle travels on a travel route shown in FIG. 14 will be described as an example. Note that in the following description, it is assumed that the current vehicle location is on a public road that is not in a parking lot. In the example shown in FIG. 14, the travel route is a route in which the vehicle travels straight from its current location, and then turns right at a next intersection 81 and further turns right at a next intersection 82, too, and makes a left turn to enter a parking lot 83 where the vehicle is to be parked. In the candidate route shown in FIG. 14, for example, when the vehicle turns right at the intersection 81, the vehicle can enter a right lane or can also enter a left lane. Note, however, that since the vehicle needs to turn right at the next intersection 82, the vehicle needs to move into the rightmost lane at the time of entering the intersection 82. In addition, when the vehicle turns right at the intersection 82, too, the vehicle can enter a right lane or can also enter a left lane. FIG. 15 shows a lane network that is constructed targeting a candidate route that allows such lane-to-lane movements.

As shown in FIG. 15, in the lane network, a candidate route for which a static travel path is to be generated is divided into a plurality of blocks (groups). Specifically, the candidate route is divided, with a location where the vehicle enters an intersection, a location where the vehicle exits the intersection, and a location where the number of lanes increases or decreases being boundaries. A node point (hereinafter, referred to as lane node) 85 is set at a point in each lane located at a boundary of each divided block. Furthermore, a link (hereinafter, referred to as lane link) 86 that connects lane nodes 85 is set. Note that a start location (i.e., a start node) of the lane network is the current vehicle location (travel start point) and an end location (i.e., an end node) of the lane network is a node (hereinafter, referred to as entry point) near an entrance to a parking lot where the vehicle is parked, the node being newly generated on an entry road facing the entrance to the parking lot, with reference to, particularly, the location of a node at the entrance to the parking lot which is set in a parking network.

In addition, the above-described lane network includes, particularly, information that identifies, by a connection of lane nodes with a lane link at an intersection, a correspondence between a lane included in a road before passing through the intersection and a lane included in a road after passing through the intersection, i.e., a lane into which the vehicle can move after passing through the intersection from a lane in which the vehicle travels before passing through the intersection. Specifically, the lane network indicates that the vehicle can move between lanes corresponding to lane nodes that are connected by a lane link among lane nodes set on a road on which the vehicle travels before passing through an intersection and lane nodes set on a road on which the vehicle travels after passing through the intersection. To generate such a lane network, the high-precision map information 16 stores, for each road connected to an intersection, lane flags indicating a correspondence between lanes and set for each combination of a road that enters the intersection and a road that exits the intersection. Upon constructing a lane network at the above-described S26, the CPU 51 forms a connection of lane nodes with a lane link at an intersection by referring to the lane flags.

Subsequently, at S27, the CPU 51 connects the lane network constructed at the above-described S26 to the intra-parking-lot network constructed at the above-described S22. Specifically, those networks are connected together by newly setting a node near the entrance to the parking lot and on the entry road facing the entrance to the parking lot where the vehicle is parked, with reference to the location of a node at the entrance to the parking lot which is set in the parking network, and connecting the newly set node to the node at the entrance to the parking lot by a link.

Thereafter, at S28, in the constructed lane network, the CPU 51 sets a movement start point, at which the vehicle starts moving, at a lane node located at a starting point of the lane network, and sets a movement target point, which is a target to which the vehicle moves, at an end point of the lane network, i.e., a lane node connected to the entrance to the parking lot (a lane node provided so as to correspond to the entry point). Then, the CPU 51 searches for a route that continuously connects the movement start point to the movement target point, by referring to the constructed lane network. For example, using Dijkstra's algorithm, a route with the smallest total value of lane costs is identified as a vehicle's way of moving into lanes which is recommended when the vehicle moves. Note that the lane cost is set, for example, using, as a reference value, the length of a lane link 86 or the time required for movement on the lane link 86, and taking into account whether or not there is a lane change and the number of lane changes. Note, however, that search means other than Dijkstra's algorithm may be used as long as a route that continuously connects the movement start point to the movement target point can be searched.

Thereafter, at S29, using the high-precision map information 16, facility information 17, connection information 18, and outside-the-road geometry information 19 obtained at the above-described S4, the CPU 51 generates a specific travel path for the vehicle to travel along the route identified in the above-described lane network. Note that for a travel path of a section including lane changes, the locations of the lane changes are set such that the lane changes are not continuously made as much as possible and are made at recommended locations a predetermined distance away from an intersection. In addition, particularly, in a case of generating a travel path taken upon making a left or right turn at an intersection or making a lane change, lateral acceleration (lateral G) occurring in the vehicle is calculated, and paths that are connected as smoothly as possible are calculated using a clothoid curve or an arc on conditions that the lateral G does not interfere with autonomous driving assistance and does not exceed an upper limit value (e.g., 0.2 G) at which a vehicle's passenger is not given discomfort. On the other hand, for a section that is neither a block having a lane change nor a block at an intersection, a path that passes through the center of a lane is a travel path recommended for the vehicle to travel along. Note, however, that for a curved corner that is curved at a substantially right angle, it is desirable to round a portion of a path corresponding to the corner. By performing the above-described processes, a travel path is generated that is recommended for the vehicle to travel along from the current vehicle location to the entry point.

Subsequently, at S30, the CPU 51 calculates, particularly, a travel path recommended upon entering the parking lot from the entry road when the vehicle moves along the vehicle's recommended travel route from the current vehicle location to the candidate parking location which is searched at the above-described S3.

Figure 16:
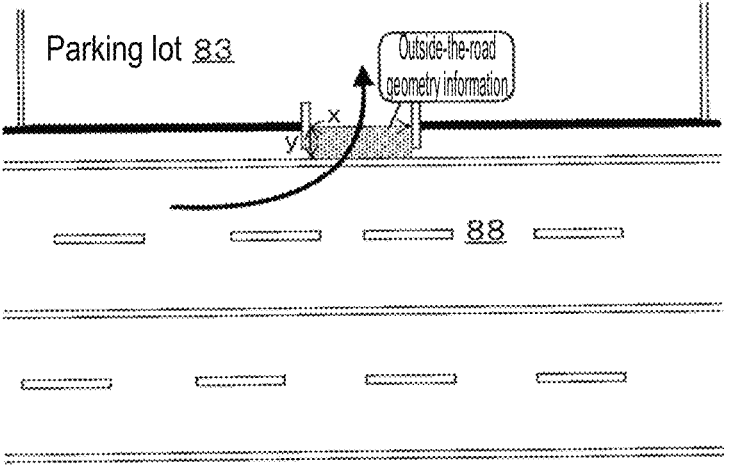
FIG. 16 is a diagram showing a travel path recommended upon entering the parking lot from an entry road.

For example, FIG. 16 describes an example of calculating a travel path when a route that enters the entrance to the parking lot 83 from the leftmost lane on an entry road 88 is set. First, the CPU 51 identifies, based on the outside-the-road geometry information obtained at the above-described S3, a region between the entry road 88 and the parking lot 83 through which the vehicle can pass (hereinafter, referred to as passage region). For example, in the example shown in FIG. 16, an x (wide) by y (long) rectangular area is a passage region between the entry road 88 and the parking lot 83 through which the vehicle can pass. Then, on condition that the vehicle passes through the passage region from the entry road 88 and enters the entrance to the parking lot 83, a path that is as smooth as possible and that has the shortest possible distance required for entry is calculated using a clothoid curve or an arc.

Thereafter, at S31, the CPU 51 connects together the travel paths calculated at the above-described S25, S29, and S30, thereby generating a static travel path which is a travel path recommended for the vehicle to travel along. The static travel path generated at the above-described S31 includes a first travel path recommended for the vehicle to travel along in lanes from the travel start point to the entry road facing the entrance to the parking lot; a second travel path recommended for the vehicle to travel along from the entry road to the entrance to the parking lot; and a third travel path recommended for the vehicle to travel along from the entrance to the parking lot to the parking location (parking space) where the vehicle is parked.

Then, the static travel path generated at the above-described S31 is stored in the flash memory 54, etc., as assistance information used for autonomous driving assistance. Thereafter, processing transitions to S6.

In addition, although, in the above-described implementation example, a travel path taken upon traveling in the parking lot, a travel path taken upon traveling on roads, and a travel path for entering the parking lot from a road are individually generated (S25, S29, and S30), travel paths including all vehicle's movements from the current vehicle location to the candidate parking location in the parking lot may be generated at once by connecting the intra-parking-lot network to the lane network.

Next, a subprocess of the travel path adding process performed at the above-described S23 will be described based on FIG. 17. FIG. 17 is a flowchart of a subprocess program of the travel path adding process.

The following processes from S41 to S45 are performed for each travel path, targeting all travel paths calculated at the above-described S22. After performing the processes from S41 to S45, targeting all travel paths calculated at the above-described S22, processing transitions to S24. Particularly, the following describes, as an example, a case in which the processes are performed on a candidate for a vehicle's travel path from the entrance to the parking lot to the parking location where the vehicle is parked, but the processes can also be likewise performed on a candidate for a vehicle's travel path from the parking location where the vehicle is parked to the exit of the parking lot.

First, at S41, the CPU 51 determines, for a processing-target travel path, whether or not the travel path satisfies conditions for suitability indicating suitability as a vehicle's travel path. Specifically, the conditions for suitability include (a) there is no backward movement in a stage of preparation for an entry into the parking space; (b) the vehicle's backward movement distance is within a threshold value; (c) the number of shifts from forward movement to backward movement and vice versa is within a threshold value; and (d) the number of changes in steering turning direction is within a threshold value. Note, however, that a determination does not need to be made for all of the above-described (a) to (d), and for example, a determination may be made for only (a) or only (c).

If it is determined that the processing-target travel path satisfies the conditions for suitability as a travel path (S41: YES), then it is determined that the processing-target travel path does not need to be modified and thus the process ends.

On the other hand, if it is determined that the processing-target travel path does not satisfy the conditions for suitability as a travel path (S41: YES), then it is determined that the travel path can be modified to a travel path that satisfies the conditions for suitability and thus processing transitions to S42.

Figure 18:
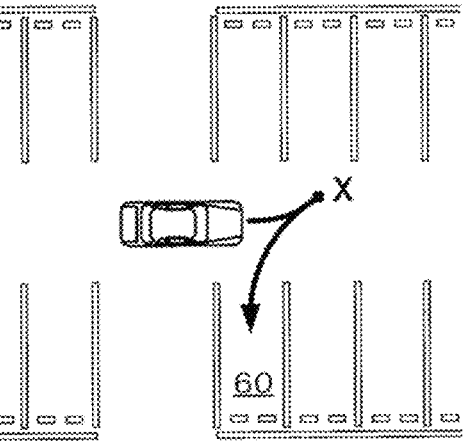
FIG. 18 is a diagram showing backward movement start locations.
Figure 18:
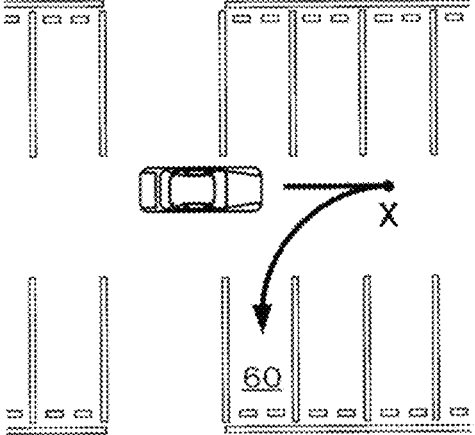

At S42, the CPU 51 calculates a backward movement start location for allowing the vehicle to enter a parking space which is the candidate parking location. For example, when, as shown in FIG. 18, the parking space 60 is a candidate parking location and the vehicle is parked in the parking space 60 from the left side of the parking space 60, a path that is as smooth as possible and has the shortest possible distance required for an entry into the parking space 60 is calculated using a clothoid curve or an arc, and a start point X of the path is determined to be a backward movement start location. Note that the number of backward movement start locations does not need to be one and there may be a plurality of backward movement start locations. Particularly, in a modification to the travel path which will be described later, a travel location taken when the vehicle travels along a passage is shifted to the right or left relative to the center of the passage, and thus, it is desirable to calculate not only a backward movement start location taken when the vehicle travels on the center of the passage, but also a backward movement start location taken when the vehicle travels more on the right or left side of the passage. For example, a top diagram of FIG. 18 shows a backward movement start location taken when the vehicle travels on the center of a passage, and a bottom diagram of FIG. 18 shows an example of a backward movement start location taken when the vehicle travels more on the left side of the passage than the center of the passage.

Thereafter, at S43, the CPU 51 searches for a point of the processing-target travel path that can be modified, by tracing back the travel path in a direction opposite to a traveling direction from a point having a factor that is determined at the above-described S41 not to satisfy a condition for suitability toward an entrance side of the parking lot (a starting-point side of the travel path). Here, for example, for a travel path that is determined not to satisfy the condition (a), the "point having a factor that is determined not to satisfy a condition for suitability" is a point where backward movement (i.e., back-and-forth movements) in a stage of preparation for an entry has occurred. In addition, for a travel path that is determined not to satisfy the condition (b), the point is a point where the vehicle moves backward a distance greater than or equal to the threshold distance. In addition, for a travel path that is determined not to satisfy the condition (c), the point is a point where shifts from forward movement to backward movement and vice versa continuously occur. In addition, for a travel path that is determined not to satisfy the condition (d), the point is a point where changes in steering turning direction continuously occur.

Note that in the present embodiment, the travel path is modified by shifting a travel location taken when the vehicle travels along a passage to the right or left relative to the center of the passage (i.e., on a parking lot link 59 of the intra-parking-lot network). Thus, the point of the travel path that can be modified at the above-described S43 is a point where a travel location can be shifted to the right or left relative to the center of a passage (i.e., on a parking lot link 59 of the intra-parking-lot network). In addition, at the above-described S43, a modification point is searched where a modification for satisfying a condition for suitability for the travel path, i.e., a modification for eliminating a factor that does not satisfy a condition for suitability, can be made.

For example, when the factor that is determined not to satisfy a condition for suitability is backward movement (i.e., back-and-forth movements) in a stage of preparation for an entry into the parking space, a modification point is searched where a modification for eliminating back-and-forth movements can be made.

Subsequently, at S44, the CPU 51 generates a travel path in which the point searched at the above-described S43 has been modified. Note that when a plurality of patterns of modification for satisfying a condition for suitability have been searched, a plurality of travel paths that are modified using the respective modification patterns are generated. Note that for a travel path modification method for shifting a travel location to the right or left relative to the center of a passage, it is possible, for example, to add a path in which the vehicle is pulled over to the right or left side of a passage, or to extend, when the vehicle turns and enters a passage where a travel location is shifted, a straight-ahead section present before the entry (to delay turning start timing), or to increase the turning radius for performing a turn for entering a passage where a travel location is shifted, and the method can be selected as appropriate.

Figure 19:
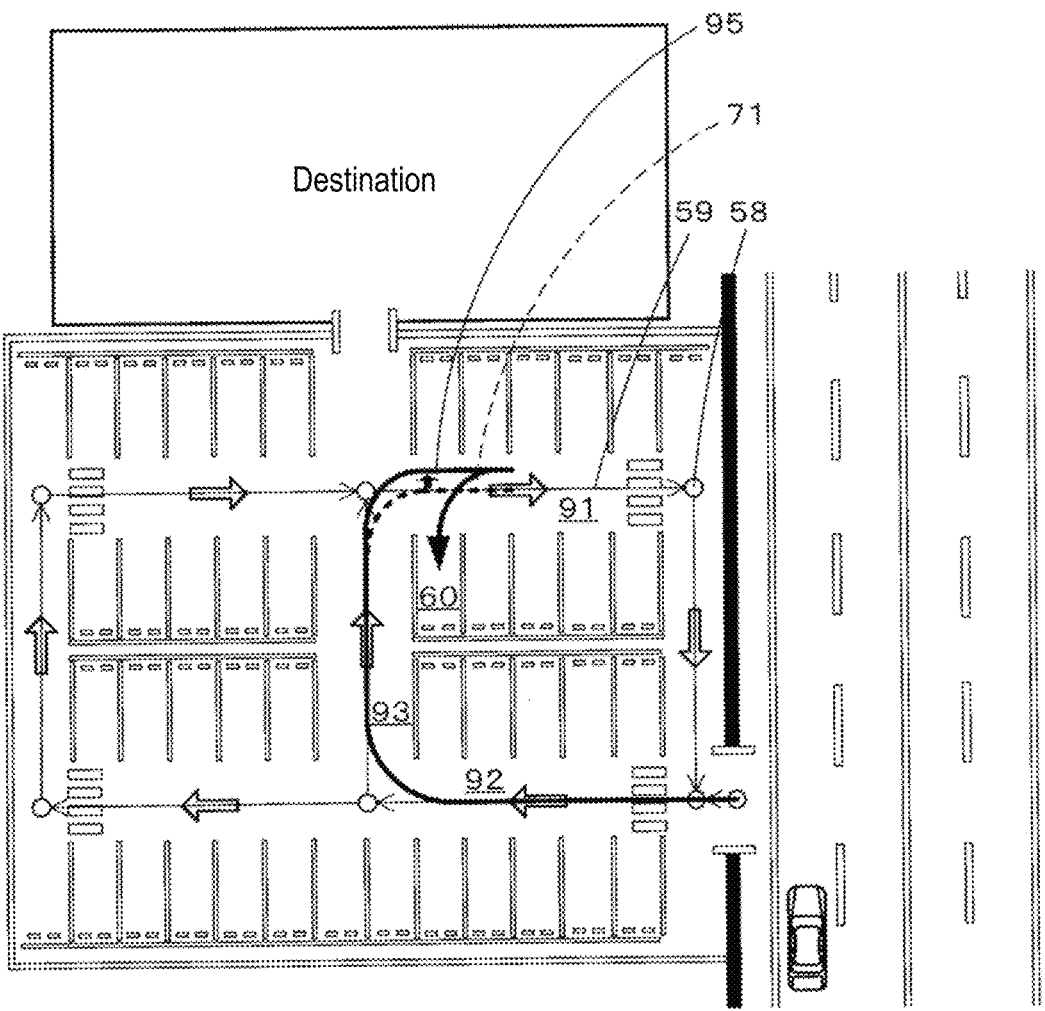
FIG. 19 is a diagram showing an example of a modified travel path.

For example, an example of a case of modifying the travel path 71 shown in FIG. 11 will be described. As a first modification pattern, there is a method in which, as shown in FIG. 19, a travel location on a passage 91 along the parking space 60 is shifted to the left relative to the center of the passage (i.e., on a parking lot link 59 of the intra-parking-lot network). As a result, a modified travel path 95 can be a travel path in which the vehicle enters the parking lot through the entrance to the parking lot, travels on the center of a passage 92 which is the first passage for the vehicle to travel on after the entry, and on the center of a passage 93 on which the vehicle travels after making a right turn after traveling on the passage 92, enters the more left side of the passage 91 than the center of the passage 91 by delaying turning start timing upon entering the passage 91 by making a right turn on the passage 93, and travels straight to reach the backward movement start location calculated at the above-described S42. The travel path 95 does not include back-and-forth movements in a stage of preparation for an entry into the parking space 60 and thus satisfies the condition for suitability.

Figure 20:
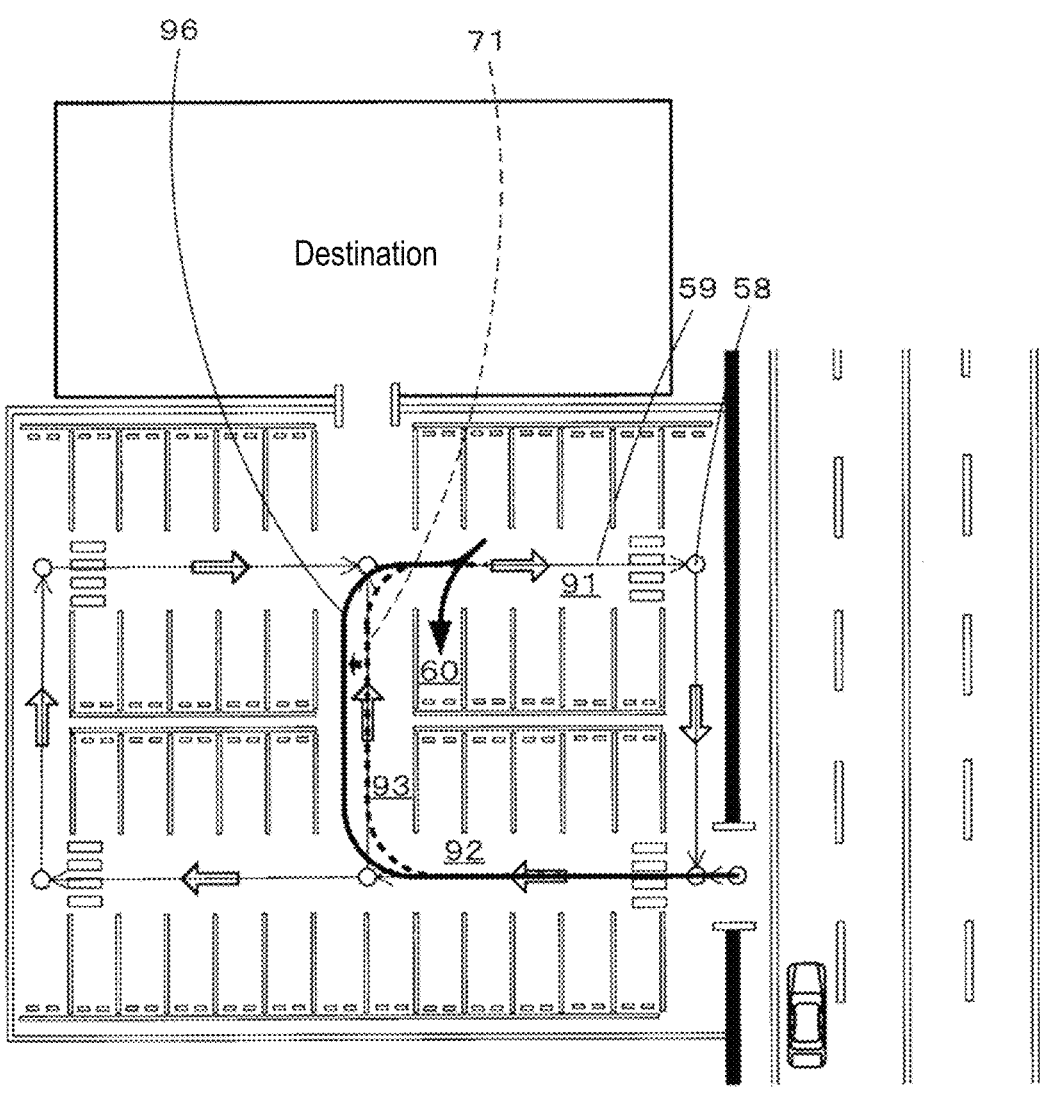
FIG. 20 is a diagram showing an example of a modified travel path.

In addition, as a second modification pattern, there is a method in which, as shown in FIG. 20, a straight-ahead distance of 91 is extended by shifting a travel location on the passage 93 to the left relative to the center of the passage (i.e., on a parking lot link 59 of the intra-parking-lot network). As a result, a modified travel path 96 can be a travel path in which the vehicle enters the parking lot through the entrance to the parking lot, travels on the center of the passage 92 which is the first passage for the vehicle to travel on after the entry, enters the more left side of the passage 93 than the center of the passage 93 by delaying turning start timing upon entering the passage 93 by making a right turn on the passage 92, travels more on the left side of the passage 93 and then turns right to enter the center of the passage 91, and travels straight and then slightly turns left in front of the parking space 60 to reach the backward movement start location calculated at the above-described S42. The travel path 96 does not include back-and-forth movements in a stage of preparation for an entry into the parking space 60 and thus satisfies the condition for suitability.

Figure 21:
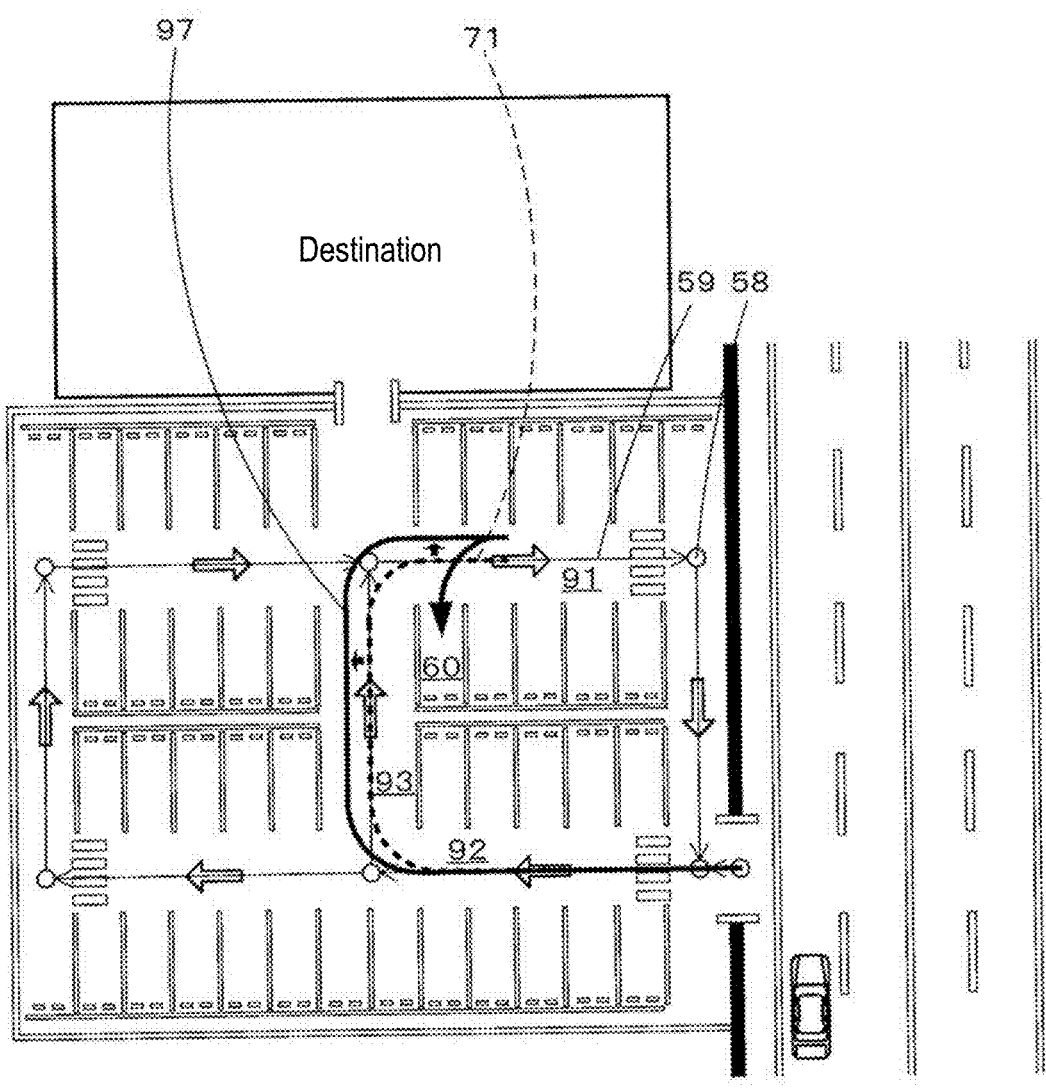
FIG. 21 is a diagram showing an example of a modified travel path.

In addition, as a third modification pattern which is a combination of the above-described first modification pattern and second modification pattern, there is a method in which, as shown in FIG. 21, each of the travel location on the passage 91 and the travel location on the passage 93 is shifted to the left relative to the center of each passage (i.e., on a parking lot link 59 of the intra-parking-lot network). As a result, a modified travel path 97 can be a travel path in which the vehicle enters the parking lot through the entrance to the parking lot, travels on the center of the passage 92 which is the first passage for the vehicle to travel on after the entry, enters the more left side of the passage 93 than the center of the passage 93 by delaying turning start timing upon entering the passage 93 by making a right turn on the passage 92, travels more on the left side of the passage 93 and then enters the more left side of the passage 91 than the center of the passage 91 by delaying turning start timing again upon entering the passage 91 by making a right turn, and travels straight to reach the backward movement start location calculated at the above-described S42. The travel path 97 does not include back-and-forth movements in a stage of preparation for an entry into the parking space 60 and thus satisfies the condition for suitability.

Note that, as described above, satisfying the conditions for suitability (a) to (d) is the second condition, and the second condition excludes a condition that the vehicle travels on the center of a passage (i.e., on a parking lot link 59 of the intra-parking-lot network) which is the first condition. At the above-described S44, the travel path generated temporarily at the above-described S22 is modified based on the second condition.

Then, at S45, the CPU 51 adds the travel path modified at the above-described S44, as a new candidate for a travel path. When there are a plurality of patterns of modification, a plurality of travel paths modified using the respective modification patterns are added. For example, in the above-described example, in addition to the travel path 71 shown in FIG. 11, the travel path 95 shown in FIG. 19, the travel path 96 shown in FIG. 20, and the travel path 97 shown in FIG. 21 are added as candidates for a travel path. Thereafter, at S24, a cost indicating suitability as a travel path is calculated for each of the candidates for a travel path including the newly added candidate for a travel path, and a candidate for a travel path with the lowest cost is selected as a recommended travel path (S24 and S25).

For example, when the travel path 71 shown in FIG. 11 is compared with the travel path 95 shown in FIG. 19 which is obtained by modifying the travel path 71, if only costs based on the above-described (1) moving distance are compared, then there is almost no difference between the travel path 71 and the travel path 95. However, as shown in FIG. 11, for the travel path 71, a travel path taken upon entering the parking space 60 requires the vehicle to turn right and shift from forward movement to backward movement at a point "a" where the vehicle has passed through the parking space 60, and move backward once, and thereafter, shift from backward movement to forward movement again at a point "b" and then slightly turn left in front of the parking space 60, and further shift from forward movement to backward movement at a point "c" and move to the parking space 60 while turning. On the other hand, for the travel path 95, there are no back-and-forth movements and the vehicle simply needs to shift from forward movement to backward movement in front of the parking space 60 from a straight-ahead state, and move into the parking space 60 while turning. Namely, compared to the travel path 95, the travel path 71 has a long backward moving distance of the travel path and also has a large number of shifts from forward movement to backward movement and vice versa and a large number of changes in steering turning direction. Namely, when costs based on the above-described (2), (3), and (5) are compared, the travel path 95 has a lower cost. Thus, the modified travel path 95 is more likely to be selected as a vehicle's recommended travel path than the travel path 71. Note, however, that the cost for a modified travel path is not always lower and may be higher.

Note that in the above-described example, description is made of an example case in which a vehicle's travel path from the entrance to the parking lot to the parking location where the vehicle is parked is modified, but for a vehicle's travel path from the parking location where the vehicle is parked to the exit of the parking lot, too, when the travel path does not satisfy a condition for suitability as a travel path, a modification can be made likewise. Specifically, when a vehicle's travel path from the parking location where the vehicle is parked to the exit of the parking lot includes a factor that does not satisfy a condition for suitability such as back-and-forth movements, a modification point of the travel path where the factor can be eliminated by shifting a travel location to the right or left from the center of a passage is searched by tracing the travel path more toward an exit side of the parking lot (traveling-direction side) than the factor (S43), and a modified travel path in which the factor is eliminated is newly added as a candidate for a travel path (S44 and S45).

As described in detail above, in the navigation device 1 and a computer program executed by the navigation device 1 according to the present embodiment, when a vehicle is parked in a parking lot, an intra-parking-lot network which is a network representing routes that can be selected by the vehicle in the parking lot is obtained (S3); a candidate entry path which is a candidate for a vehicle's travel path from an entrance to the parking lot to a parking location where the vehicle is parked is generated and obtained using the intra-parking-lot network and based on a first condition (S22); it is determined whether or not the candidate entry path satisfies a condition for suitability indicating suitability as a vehicle's travel path (S41); when it is determined that the condition for suitability is not satisfied, the candidate entry path determined not to satisfy the condition for suitability is modified based on a second condition different from the first condition (S42 to S45); and driving assistance is provided based on the modified candidate entry path. Thus, by temporarily generating, using the intra-parking-lot network, a candidate for a vehicle's travel path from the entrance to the parking lot to the parking location where the vehicle is parked, evaluating suitability as a travel path for the generated candidate for a travel path, and modifying the temporarily generated candidate for a travel path based on a result of the evaluation and by changing a generation condition, particularly, unsuitable operations such as shifts from forward movement to backward movement and vice versa and back-and-forth turning of a steering wheel are reduced, enabling provision of driving assistance based on a more appropriate travel path compared to conventional cases.

In addition, for the candidate entry path determined not to satisfy the condition for suitability, a portion of the path closer to an entrance side of the parking lot than a point having a factor that does not satisfy the condition for suitability is modified. Thus, it becomes possible to modify the travel path to a more appropriate travel path in which a factor that does not satisfy the condition for suitability is eliminated.

In addition, the intra-parking-lot network is a network obtained by setting links on passages in the parking lot on which the vehicle can travel, setting a node at a connecting point between the passages, and linking the links to the node, and the first condition is that the path is a path in which the vehicle travels on the links. Thus, it becomes possible to generate a candidate entry path using the intra-parking-lot network.

In addition, the second condition is a condition for modifying the path to a path that satisfies the condition for suitability by excluding the first condition. Thus, by excluding the first condition which is a condition used to generate an initial candidate entry path, it becomes possible to modify the travel path to a travel path that satisfies the condition for suitability.

In addition, the condition for suitability includes at least one or more of a condition that there is no backward movement in a stage of preparation for an entry into a parking space; a condition that a vehicle's backward movement distance is within a threshold value; a condition that the number of shifts from forward movement to backward movement and vice versa is within a threshold value; and a condition that the number of changes in steering turning direction is within a threshold value. Thus, by modifying a travel path involving vehicle behavior that is not suitable as a travel path, it becomes possible to provide driving assistance based on a more appropriate travel path compared to conventional cases.

In addition, when a vehicle is parked in a parking lot, an intra-parking-lot network which is a network representing routes that can be selected by the vehicle in the parking lot is obtained (S3); a candidate exit path which is a candidate for a vehicle's travel path from a vehicle's parking location to an exit of the parking lot is generated and obtained using the intra-parking-lot network and based on a first condition (S22); it is determined whether or not the candidate exit path satisfies a condition for suitability indicating suitability as a vehicle's travel path (S41); when it is determined that the condition for suitability is not satisfied, the candidate exit path determined not to satisfy the condition for suitability is modified based on a second condition different from the first condition (S42 to S45); and driving assistance is provided based on the modified candidate exit path. Thus, by temporarily generating, using the intra-parking-lot network, a candidate for a vehicle's travel path from the vehicle's parking location to the exit of the parking lot, evaluating suitability as a travel path for the generated candidate for a travel path, and modifying the temporarily generated candidate for a travel path based on a result of the evaluation and by changing a generation condition, particularly, unsuitable operations such as shifts from forward movement to backward movement and vice versa and back-and-forth turning of a steering wheel are reduced, enabling provision of driving assistance based on a more appropriate travel path compared to conventional cases.

Note that the present disclosure is not limited to the above-described embodiment, and it is, of course, possible to make various modifications and alterations thereto without departing from the spirit and scope of the present disclosure.

For example, in the present embodiment, a plurality of candidates for a parking location are obtained and a parking location is finally determined from among the plurality of candidates at timing at which a static travel path is generated at S5, but one parking location where the vehicle is parked may be determined first and then a travel path to the determined parking location may be generated.

In addition, in the present embodiment, a case is assumed in which a vehicle's travel start point is on a road, but aspects of the present disclosure can also be applied to a case in which the travel start point is in a parking lot. In that case, a travel path recommended for the vehicle to travel along from the travel start point to the exit of the parking lot is also derived at the above-described S25.

In addition, in the present embodiment, when a travel path is modified at the above-described S23, costs are calculated not only for the modified travel path but also for the travel path obtained before modification (S24), but a cost may be calculated only for the modified travel path. In addition, when there is no other candidate for a travel path, the modified travel path may be generated as a static travel path without calculating a cost.

In addition, in the present embodiment, a cost for a travel path to a parking location is calculated targeting only vehicle's travel (S24), but a cost may be calculated taking also into account movement on foot to a destination made after getting out of the vehicle. Namely, a high cost may be calculated for a travel path to a parking location in which vehicle's travel movement to the parking location is easy but there is a great burden on movement on foot to the destination thereafter.

In addition, in the present embodiment, after generating a travel path to a parking location, vehicle control for traveling along the generated travel path is performed (S11 and S12), but it is also possible to omit processes related to vehicle control at and after S11. For example, the navigation device 1 may be a device that provides guidance on a parking location recommended for parking or provides guidance on a travel path to the user, without performing vehicle control based on the travel path.

In addition, in the present embodiment, a static travel path that is finally generated is information that identifies a specific path (a set of coordinates and lines) along which the vehicle travels, but the static travel path may be information that does not identify a specific path but can identify roads, lanes, and passages where the vehicle is to travel. In addition, instead of identifying a specific travel path, only roads on which the vehicle travels and a parking location where the vehicle is parked in a parking lot may be identified.

In addition, in the present embodiment, a lane network and an intra-parking-lot network are generated using high-precision map information 16 and facility information 17 (S3, S22, and S26), but networks that target roads and parking lots across the country may be stored in advance in a DB, and the networks may be read from the DB as necessary.

In addition, in the present embodiment, high-precision map information included in the server device 4 includes both pieces of information about the lane geometries of roads (lane-by-lane road geometries, curvatures, lane widths, etc.) and information about markings (centerlines, lane lines, edge lines, guidelines, etc.) painted on the roads, but may include only the information about markings or may include only the information about the lane geometries of roads. For example, even when only the information about markings is included, it is possible to estimate information corresponding to the information about the lane geometries of roads, based on the information about markings. In addition, even when only the information about the lane geometries of roads is included, it is possible to estimate information corresponding to the information about markings, based on the information about the lane geometries of roads. In addition, the "information about markings" may be information that identifies the types or layout of markings themselves that mark off lanes, or may be information that identifies whether or not a lane change can be made between adjacent lanes, or may be information that directly or indirectly identifies the geometries of lanes.

In addition, in the present embodiment, as means for reflecting a dynamic travel path in a static travel path, a part of the static travel path is replaced by the dynamic travel path (S9), but instead of replacement, the static travel path may be modified to approximate to the dynamic travel path.

In addition, the present embodiment describes that autonomous driving assistance for performing autonomous travel independently of user's driving operations refers to control, by the vehicle control ECU 40, of all of an accelerator operation, a brake operation, and a steering wheel operation which are operations related to vehicle behavior among vehicle's operations. However, the autonomous driving assistance may refer to control, by the vehicle control ECU 40, of at least one of an accelerator operation, a brake operation, and a steering wheel operation which are operations related to vehicle behavior among vehicle's operations. On the other hand, it is described that manual driving by user's driving operations refers to performing, by the user, of all of an accelerator operation, a brake operation, and a steering wheel operation which are operations related to vehicle behavior among vehicle's operations.

In addition, driving assistance of the present disclosure is not limited to autonomous driving assistance related to vehicle's autonomous driving. For example, it is also possible to provide driving assistance by displaying a static travel path identified at the above-described S5 or a dynamic travel path generated at the above-described S8 on a navigation screen and providing guidance using voice, a screen, etc. (e.g., guidance on a lane change or guidance on a recommended vehicle speed). In addition, user's driving operations may be assisted by displaying a static travel path or a dynamic travel path on a navigation screen.

In addition, in the present embodiment, a configuration is adopted in which the autonomous driving assistance program (FIG. 4) is executed by the navigation device 1, but a configuration may be adopted in which the autonomous driving assistance program is executed by an in-vehicle device other than the navigation device 1 or by the vehicle control ECU 40. In that case, a configuration is adopted in which the in-vehicle device or the vehicle control ECU 40 obtains a current vehicle location, map information, etc., from the navigation device 1 or the server device 4. Furthermore, the server device 4 may perform some or all of the steps of the autonomous driving assistance program (FIG. 4). In that case, the server device 4 corresponds to a driving assistance device of the present application.

In addition, aspects of the present disclosure can also be applied to mobile phones, smartphones, tablet terminals, personal computers, etc. (hereinafter, referred to as portable terminals, etc.) in addition to navigation devices. In addition, these aspects can also be applied to a system including a server and a portable terminal, etc. In that case, a configuration may be adopted in which each step of the above-described autonomous driving assistance program (see FIG. 4) is performed by either one of the server and the portable terminal, etc. Note, however, that when these aspects are applied to a portable terminal, etc., a vehicle that can provide autonomous driving assistance needs to be connected to the portable terminal, etc. such that they can communicate with each other (it does not matter whether they are connected by wire or wirelessly).

REFERENCE SIGNS LIST

1: Navigation device (driving assistance device), 2: Driving assistance system, 3: Information delivery center, 4: Server device, 5: Vehicle, 16: High-precision map information. 17: Facility information, 18: Connection information, 19: Outside-the-road geometry information, 33: Navigation ECU, 40: Vehicle control ECU. 51: CPU, 58: Parking lot node, 59: Parking lot link, 75: Pedestrians' passage space, and 95 to 97: Modified travel path.

The invention claimed is:

1. A driving assistance device comprising:
intra-parking-lot network obtaining means for obtaining an intra-parking-lot network when a vehicle is parked in a parking lot, the intra-parking-lot network being a network representing a route that can be selected by a vehicle in the parking lot;
candidate entry path obtaining means for generating and obtaining a candidate entry path, using the intra-parking-lot network and based on a first condition, the candidate entry path being a candidate for a vehicle's travel path from an entrance to a parking lot to a parking location where a vehicle is parked;
condition determining means for determining whether or not the candidate entry path satisfies a condition for suitability indicating suitability as a vehicle's travel path;
travel path modifying means for modifying, when the condition determining means has determined that the condition for suitability is not satisfied, the candidate entry path determined not to satisfy the condition for suitability, based on a second condition different from the first condition; and
driving assistance means for providing driving assistance based on the modified candidate entry path,
wherein
the intra-parking-lot network is a network obtained by setting links on passages that allow a vehicle to travel on in a parking lot, setting a node at a connecting point between the passages, and linking the links to the node, and
the first condition is that the path is a path in which the vehicle travels on the links.

2. The driving assistance device according to claim 1, wherein for the candidate entry path determined not to satisfy the condition for suitability, the travel path modifying means modifies a portion of the path closer to an entrance side of a parking lot than a point having a factor that does not satisfy the condition for suitability.

3. The driving assistance device according to claim 1, wherein the second condition is a condition for modifying the path to a path that satisfies the condition for suitability by excluding the first condition.

4. A driving assistance device comprising:
intra-parking-lot network obtaining means for obtaining an intra-parking-lot network when a vehicle is parked in a parking lot, the intra-parking-lot network being a network representing a route that can be selected by a vehicle in the parking lot;
candidate entry path obtaining means for generating and obtaining a candidate entry path, using the intra-parking-lot network and based on a first condition, the candidate entry path being a candidate for a vehicle's travel path from an entrance to a parking lot to a parking location where a vehicle is parked;
condition determining means for determining whether or not the candidate entry path satisfies a condition for suitability indicating suitability as a vehicle's travel path;
travel path modifying means for modifying, when the condition determining means has determined that the

35 condition for suitability is not satisfied, the candidate
entry path determined not to satisfy the condition for
suitability, based on a second condition different from
the first condition; and
driving assistance means for providing driving assistance
based on the modified candidate entry path,
wherein the condition for suitability includes at least one
or more of a condition that there is no backward
movement in a stage of preparation for an entry into a
parking space; a condition that a vehicle's backward
movement distance is within a threshold value; a con-
dition that a number of shifts from forward movement
to backward movement and vice versa is within a
threshold value; and a condition that a number of
changes in steering turning direction is within a threshold value.
5. A driving assistance device comprising:
intra-parking-lot network obtaining means for obtaining
an intra-parking-lot network when a vehicle exits a
parking lot where the vehicle is parked, the intra-parking-lot network being a network representing a
route that can be selected by a vehicle in the parking
lot;
candidate exit path obtaining means for generating and
obtaining a candidate exit path, using the intra-parking-lot network and based on a first condition, the candidate
exit path being a candidate for a vehicle's travel path
from a parking location where a vehicle is parked to an
exit of a parking lot;
condition determining means for determining whether or
not the candidate exit path satisfies a condition for
suitability indicating suitability as a vehicle's travel
path;
travel path modifying means for modifying, when the
condition determining means has determined that the
condition for suitability is not satisfied, the candidate
exit path determined not to satisfy the condition for
suitability, based on a second condition different from
the first condition; and
driving assistance means for providing driving assistance
based on the modified candidate exit path,
wherein

36 the intra-parking-lot network is a network obtained by
setting links on passages that allow a vehicle to travel
on in a parking lot, setting a node at a connecting point
between the passages, and linking the links to the node,
and
the first condition is that the path is a path in which the
vehicle travels on the links.
6. A non-transitory computer readable medium storing a
computer program for causing a computer to function as:
intra-parking-lot network obtaining means for obtaining
an intra-parking-lot network when a vehicle is parked
in a parking lot, the intra-parking-lot network being a
network representing a route that can be selected by a
vehicle in the parking lot;
candidate entry path obtaining means for generating and
obtaining a candidate entry path, using the intra-park-
ing-lot network and based on a first condition, the
candidate entry path being a candidate for a vehicle's
travel path from an entrance to a parking lot to a
parking location where a vehicle is parked;
condition determining means for determining whether or
not the candidate entry path satisfies a condition for
suitability indicating suitability as a vehicle's travel
path;
travel path modifying means for modifying, when the
condition determining means has determined that the
condition for suitability is not satisfied, the candidate
entry path determined not to satisfy the condition for
suitability, based on a second condition different from
the first condition; and
driving assistance means for providing driving assistance
based on the modified candidate entry path,
wherein
the intra-parking-lot network is a network obtained by
setting links on passages that allow a vehicle to travel
on in a parking lot, setting a node at a connecting point
between the passages, and linking the links to the node,
and
the first condition is that the path is a path in which the
vehicle travels on the links.

* * * * *